(12) United States Patent
Dharaskar et al.

(10) Patent No.: US 12,204,567 B2
(45) Date of Patent: Jan. 21, 2025

(54) SYSTEM AND METHOD FOR JOINING DATASETS

(71) Applicant: Ikigai Labs, Inc., San Francisco, CA (US)

(72) Inventors: Arth Dharaskar, Cambridge, MA (US); Nathaniel Clinton Lanier, Cambridge, MA (US); Vinayak Ramesh, San Francisco, CA (US); Amar Himansu Shah, Cambridge, MA (US); Devavrat Dilitkumar Shah, Cambridge, MA (US); Jaehyun Sim, Cambridge, MA (US)

(73) Assignee: Ikigai Labs, Inc., San Francisco, CA (US)

( * ) Notice: Subject to any disclaimer, the term of this patent is extended or adjusted under 35 U.S.C. 154(b) by 18 days.

(21) Appl. No.: 18/184,834

(22) Filed: Mar. 16, 2023

(65) Prior Publication Data

US 2023/0325418 A1     Oct. 12, 2023

Related U.S. Application Data

(60) Provisional application No. 63/269,506, filed on Mar. 17, 2022.

(51) Int. Cl.
*G06F 16/22*     (2019.01)
*G06F 16/31*     (2019.01)
(Continued)

(52) U.S. Cl.
CPC ........ *G06F 16/313* (2019.01); *G06F 16/2282* (2019.01); *G06F 16/316* (2019.01); *G06F 16/3347* (2019.01); *G06F 40/284* (2020.01)

(58) Field of Classification Search
CPC ............................................. G06F 16/22–2282
See application file for complete search history.

(56) References Cited

U.S. PATENT DOCUMENTS 6,477,665 B1   11/2002   Bowman-Amuah
8,176,471 B2    5/2012   Novacek
(Continued)

FOREIGN PATENT DOCUMENTS

AU   2013270490 A1   7/2014
CA      2634020 A1   11/2009
(Continued)

*Primary Examiner* — James E Richardson
*Assistant Examiner* — Nirav K Khakhar
(74) *Attorney, Agent, or Firm* — Intrinsic Law Corp.

(57) ABSTRACT

A computer-implemented method comprising: receiving, with a computer, first and second datasets; performing, with the computer, column discovery on the first and second datasets using a first trained machine-learning model to produce a column map that indexes one or more columns in the first dataset to one or more columns in the second dataset; performing, with the computer, row discovery on the first and second datasets using a second trained machine-learning model, a trained approximate nearest neighbor index, and the column discovery to produce a row map that indexes one or more rows in the first dataset to one or more rows in the second dataset; combining, with the computer, the first and second datasets using the column map and the row map to form a combined dataset; and performing one or more actions with the combined dataset.

26 Claims, 22 Drawing Sheets

(51) Int. Cl.
*G06F 16/33* (2019.01)
*G06F 40/284* (2020.01)

(56) References Cited

U.S. PATENT DOCUMENTS

| | | | |
|---|---|---|---|
| 9,111,212 B2 | 8/2015 | Jones | |
| 10,217,169 B2 | 2/2019 | Schumann, Jr. et al. | |
| 10,565,038 B1 | 2/2020 | Shah et al. | |
| 10,769,528 B1 | 9/2020 | Wang et al. | |
| 10,783,998 B1 | 9/2020 | Perlin et al. | |
| 10,817,791 B1 | 10/2020 | Shoemaker et al. | |
| 10,885,099 B1 | 1/2021 | Price et al. | |
| 10,914,698 B2 | 2/2021 | Potyrailo et al. | |
| 10,943,301 B1 | 3/2021 | Wu et al. | |
| 11,392,855 B1 | 7/2022 | Murakonda et al. | |
| 11,410,243 B2 | 8/2022 | Rabinowitz et al. | |
| 11,526,521 B2 | 12/2022 | Diaz et al. | |
| 2007/0079223 A1 | 4/2007 | Mondin et al. | |
| 2008/0154821 A1 | 6/2008 | Poulin | |
| 2010/0146396 A1 | 6/2010 | Able et al. | |
| 2013/0292461 A1 | 11/2013 | Plutt et al. | |
| 2014/0245207 A1 | 8/2014 | Poulin | |
| 2016/0140452 A1 | 5/2016 | Garcia Sedano et al. | |
| 2017/0270435 A1 | 9/2017 | Gallardo | |
| 2018/0137219 A1 | 5/2018 | Goldfarb et al. | |
| 2018/0210907 A1* | 7/2018 | Hamada | G06F 16/3347 |
| 2019/0156600 A1 | 5/2019 | Potyrailo et al. | |
| 2019/0260879 A1 | 8/2019 | Raleigh et al. | |
| 2019/0339688 A1 | 11/2019 | Cella et al. | |
| 2020/0104457 A1 | 4/2020 | Chuang et al. | |
| 2020/0113479 A1 | 4/2020 | Baricevic et al. | |
| 2020/0206405 A1 | 7/2020 | Wyeth et al. | |
| 2021/0019321 A1 | 1/2021 | Ehrlich et al. | |
| 2021/0049532 A1 | 2/2021 | Smith et al. | |
| 2021/0109894 A1 | 4/2021 | Ramesh et al. | |
| 2022/0318224 A1* | 10/2022 | Thompson | G06V 10/70 |

FOREIGN PATENT DOCUMENTS

| | | |
|---|---|---|
| CA | 2390895 C | 5/2012 |
| CA | 2919608 A1 | 2/2014 |
| CA | 2905503 A1 | 9/2014 |
| CA | 3050005 A1 | 7/2018 |
| CA | 3064771 A1 | 12/2018 |
| CA | 3066775 A1 | 4/2019 |
| CN | 108536652 A | 9/2018 |
| CN | 110288142 A | 9/2019 |
| CN | 110688585 A | 1/2020 |
| CN | 114711763 A | 7/2022 |
| CN | 110363349 B | 8/2022 |
| FR | 3005368 A1 | 11/2014 |
| TW | 201032009 A | 9/2010 |

* cited by examiner

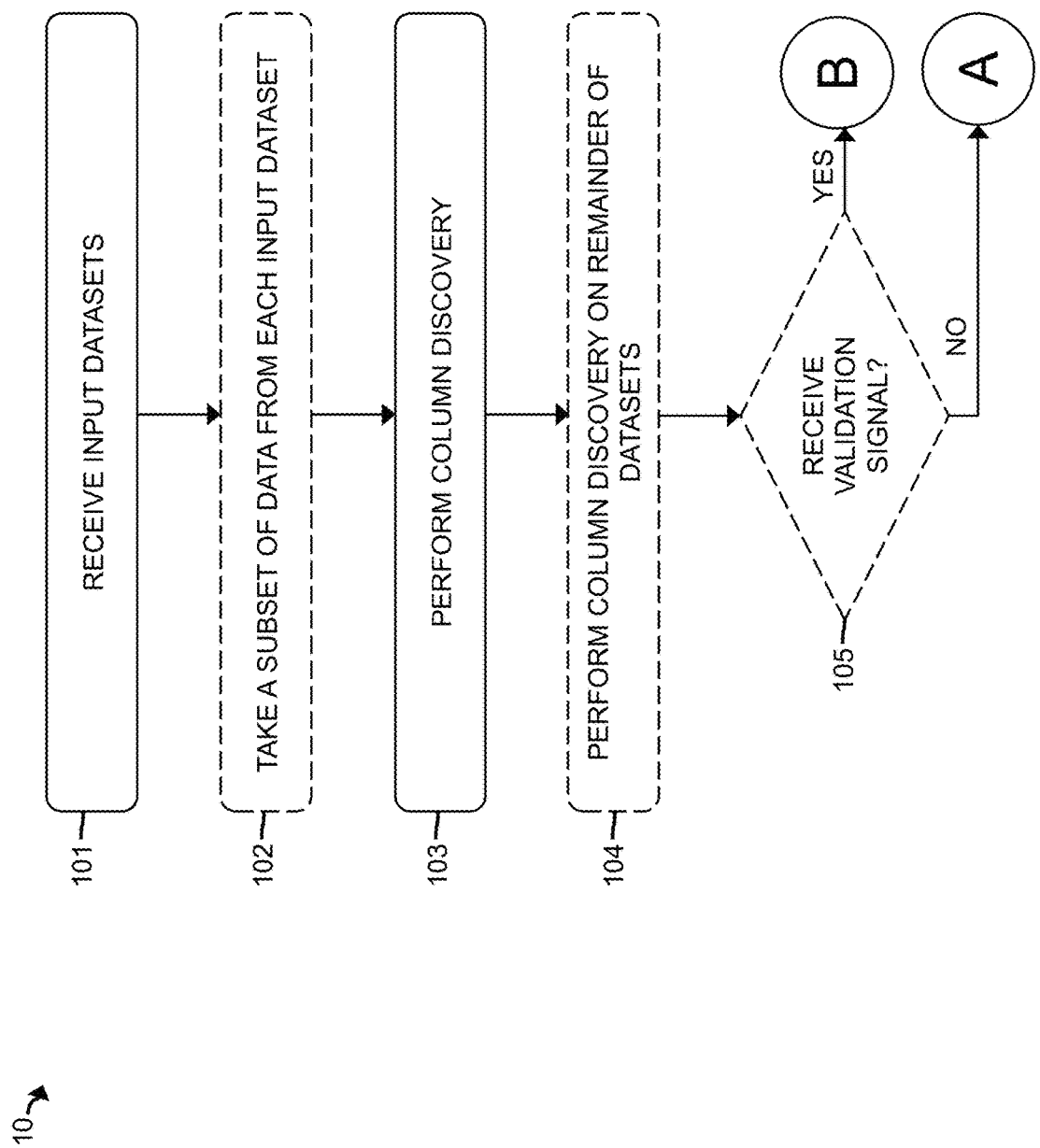

| First | Last | Postal Code |
|---|---|---|
| JONES | ANGELA | 210012 |
| WILLIAMS | BLAKE | 210002 |

TABLE 1

| Name | Postalcode |
|---|---|
| Jones, Angela | 210-012 |
| William, Blake | 210-002 |

TABLE 2

FIG. 2

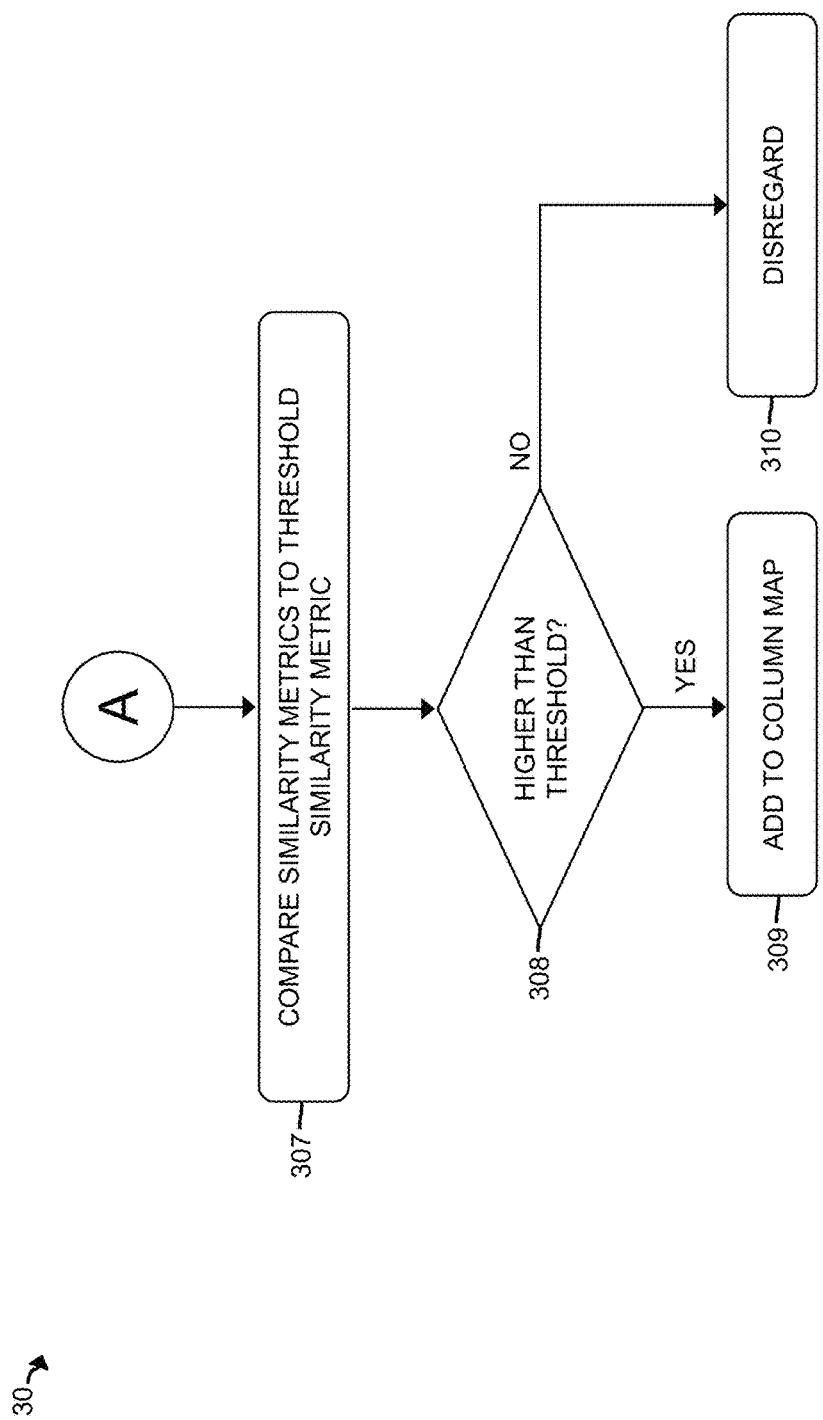

TABLE 1 (FIG. 4A)

| First | Last | Postal Code |
|---|---|---|
| "JONES" | "ANGELA" | "210012" |
| "WILLIAMS" | "BLAKE" | "210002" |

TABLE 2 (FIG. 4A)

| Name | Postalcode |
|---|---|
| "Jones, Angela" | "210-012" |
| "William, Blake" | "210-002" |

FIG. 4A

TABLE 1 (FIG. 4B)

| First | Last | Postal Code |
|---|---|---|
| "jones" | "angela" | "210012" |
| "williams" | "blake" | "210002" |

TABLE 2 (FIG. 4B)

| Name | Postalcode |
|---|---|
| "jones, angela" | "210-012" |
| "william, blake" | "210-002" |

FIG. 4B

TABLE 1 (20)

| First | Last | Postal Code |
|---|---|---|
| "jon es" | "ang ela" | "210 012" |
| "wil lia ms" | "bla ke" | "210 002" |

TABLE 2 (22)

| Name | Postalcode |
|---|---|
| "jon es, ang ela" | "210 -01 2" |
| "wil lia m, bla ke" | "210 -00 2" |

FIG. 5

| First | Last | Postal Code |
|---|---|---|
| "jon es" "wil lia ms" | "ang ela" "bla ke" | "210 012" "210 002" |

TABLE 1

| Name | Postalcode |
|---|---|
| "jon es, ang ela" "wil lia m, bla ke" | "210 -01 2" "210 -00 2" |

TABLE 2

FIG. 6

$$800 \rightarrow \begin{vmatrix} 0.99 & 0.81 \\ 0.95 & 0.85 \\ 0.75 & 0.99 \end{vmatrix}$$

FIG. 8A

$$810 \rightarrow \begin{vmatrix} 1 & 0 \\ 1 & 0 \\ 0 & 1 \end{vmatrix}$$

FIG. 8B

$$820 \rightarrow \begin{vmatrix} 1 & 1 & 0 \\ 0 & 0 & 1 \end{vmatrix}$$

FIG. 8C

| Concatenated Rows 1 |
|---|
| "jon es" "ang ela" "210 012" |
| "wil lia ms" "bla ke" "210 002" |

TABLE 1

| Concatenated Rows 2 |
|---|
| "jon es, ang ela" "210 -01 2" |
| "wil lia m, bla ke" "210 -00 2" |

TABLE 2

FIG. 11

| Similarity | First_left | Last_left | Name_right | Postal Code_left | Postalcode_right | Prediction |
|---|---|---|---|---|---|---|
| 0.98 | JONES | ANGELA | Jones, Angela | 210012 | 210-012 | TRUE MATCH |
| 0.97 | WILLIAMS | BLAKE | William, Blake | 210002 | 210-002 | TRUE MATCH |

```xml
<?xml version = "1.0"?>
<Company>
<Employee>
<identifier> 0 </identifier>
<FirstName>John</FirstName>
<LastName>Doe</LastName>
<ContactNo>1234567890</ContactNo>
<Email>johndoe@xyz.com</Email>
<Address>
    <City>Boston</City>
    <State>Massachusetts</State>
    <Zip>02110</Zip>
</Address>
</Employee>
</Company>
```

FIG. 19 ly and long used. Computer

SYSTEM AND METHOD FOR JOINING DATASETS

CROSS-REFERENCE TO RELATED APPLICATIONS

This application claims priority to U.S. Provisional Application No. 63/269,506, titled "System and Method for Joining Datasets," filed on Mar. 17, 2022, which is hereby incorporated by reference.

TECHNICAL FIELD

This application relates generally to the analysis and processing of information contained in datasets such as databases, tables, and spreadsheets.

BACKGROUND

The use of databases, tables and spreadsheets to organize information and data is widely and long used. Computer applications that facilitate such management of information pervade almost every sector of business, science, healthcare, education, the financial industry and other sectors. Traditionally, a user purchases, subscribes, installs or otherwise adopts a given vendor's platform (e.g., a suite of software including database or spreadsheet applications) and learns how to use the vendor's platform. The user imports or enters information in the form of data in a form and format that is compatible with the chosen platform. Well-known examples have been available from Lotus, Microsoft and Google. Since some software products become commercially successful or dominant, a community of users grows around the dominant platforms. This enables the easy sharing and transport of data and data files compatible with these platforms among the community of users. However, one problem can arise if a user wishes to use or implement a project on data that is created or formatted or organized for compatibility with a platform different from the platform the user wishes to use. Some imperfect solutions have been developed to address this issue whereby a utility or import function can identify the form of the data being imported and convert it to a different form that is usable with another platform. This solution can be subject to errors or failures as the platforms are often updated over time and the internal details of the platforms are only known to the vendors supplying said platforms, sometimes intentionally or unintentionally being opaque and/or proprietary in nature.

Another issue with processing and managing data in multiple databases, tables, or spreadsheets (generally "datasets") is that of joining. Here, a user wishes to merge, combine, stitch, consolidate, or mingle (generally "join") some or all information between more than one data file or dataset each containing some data that is separately or originally organized and formatted in its respective file or dataset. The joining issue can arise whether the two original datasets share a same platform or whether they come from different platforms as discussed earlier. It is common that two original datasets, even if the datasets describe the same or similar subject matter, can be differently organized or differently annotated. We may refer to this by saying that the different datasets share or do not share common keys that can be identified by a computer system to join the datasets. Stated differently, the notation and/or organization of the contents of the datasets can therefore be different even though they refer to the same or similar subject, making it challenging for a simple computer application to match corresponding elements of two datasets together. Many examples of datasets which pose challenges to joining may be considered. For example, if two datasets describe ambient temperature in a respective column entitled "Temperature", one of the datasets may list the temperature entries in degrees Celsius while the other dataset may list the temperature entries in degrees Fahrenheit. If the operator or the computer application were to recognize that both of these columns refer to the same thing (because they both have the same heading or title "Temperature") then it could be relatively easy to join these datasets by making a suitable conversion between the Celsius and Fahrenheit unit systems. Another example of a joining issue can arise if the data columns relate to pricing where the units of currency are in different currencies. One dataset list a "Price" in Euros while the other dataset lists the "Price" in US Dollars. Here, not only is there a unit conversion involved, but the conversion factor may be time dependent as the two currencies fluctuate in relative value over time. But again, this joining issue can be resolved through suitable programming of the system performing the join operation.

Even more challenging situations occur where the datasets to be joined and their respective contents are not identified with the same headings or titles. While it is clear to assume that two columns entitled "Temperature" in two datasets refer to the same class of information (temperature), it is less obvious to join two columns of data if one dataset refers to "Name" and the other refers to "Customer" even though both dataset columns may be referring to the name of a customer. Additionally, joining problems can arise if the nature or format of the data entries themselves is inconsistent within one or more of the datasets to be joined. For example, one dataset may refer to the name of a customer as "John Smith" while the other may refer to the same person as "Smith, John" or "J. Smith" or "Smith_John", or even identify the same person by information other than their given name (e.g., an ID number, a user name, or even a genetic or biometric identification factor). In yet other examples, specific data entries may differ or may be missing from one of the datasets being joined where it is present in the other, which again complicates the automation of a process for joining such two or more datasets.

SUMMARY

Example embodiments described herein have innovative features, no single one of which is indispensable or solely responsible for their desirable attributes. The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Without limiting the scope of the claims, some of the advantageous features will now be summarized. Other objects, advantages and novel features of the disclosure will be set forth in the following detailed description of the disclosure when considered in conjunction with the drawings, which are intended to illustrate, not limit, the invention.

An aspect of the invention is directed to a computer-implemented method comprising: receiving, with a computer, first and second datasets; performing, with the computer, column discovery on the first and second datasets using a first trained machine-learning model that generates first vector embeddings to produce a column map that indexes one or more columns in the first dataset to one or more columns in the second dataset; performing, with the computer, row discovery on the first and second datasets using a second trained machine-learning model that generates second vector embeddings, a trained approximate nearest neighbor (ANN) index, and the first vector embeddings to produce a row map that indexes one or more rows in the first dataset to one or more rows in the second dataset; combining, with the computer, the first and second datasets using the column map and the row map to form a combined dataset; and performing one or more actions with the combined dataset.

In one or more embodiments, the first and second datasets comprise first and second tables, respectively. In one or more embodiments, the step of performing column discovery further includes training and fitting, with the computer, a first machine-learning model on a corpus of concatenated n-grams of dataset values taken along a respective column dimension of respective columns of the first and second datasets to form the first trained word vectorizer. In one or more embodiments, the first machine-learning model includes a word vectorizer. In one or more embodiments, the word vectorizer further includes a dimensionality-reduction model.

In one or more embodiments, the step of performing column discovery further includes: converting, with the computer, the dataset values in a subset of columns in the first and second datasets to respective text strings; converting, with the computer, each text string to one or more n-grams, each n-gram having n characters from the respective text string, where n is an integer of at least 2; and concatenating, with the computer, the n-gram(s) of each text string along the respective column dimension of the respective columns to form the corpus of concatenated n-grams.

In one or more embodiments, the step of performing column discovery further includes: producing, with the first trained machine-learning model, a plurality of vectors that correspond to the respective columns; combining, with the computer, the vectors that correspond to the respective columns of the first and second datasets into first and second matrices, respectively; determining, with the computer, similarity metrics for the first and second matrices, wherein each similarity metric represents a quantitative similarity between the dataset values in a respective first-dataset column and the dataset values in a respective second-dataset column; determining, with the computer, whether any of the similarity metrics is higher than a threshold similarity metric; and adding, with the computer, for each similarity metric that is higher than the threshold similarity metric, a respective column index to the column map, the respective column index indicating an association between the respective first-dataset column and the respective second-dataset column. In one or more embodiments, the step of performing column discovery further includes discarding, with the computer, each similarity metric that is lower than or equal to the threshold similarity metric to indicate that there is no association between the respective first-dataset column and the respective second-dataset column.

In one or more embodiments, the step of performing row discovery further includes training and fitting, with the computer, a second machine-learning model on a corpus of concatenated n-grams of dataset values taken along a respective row dimension of respective rows of the first and second datasets to form the second trained word vectorizer. In one or more embodiments, the second machine-learning model includes a word vectorizer. In one or more embodiments, the word vectorizer further includes a dimensionality-reduction model.

In one or more embodiments, the step of performing row discovery further includes: producing, with the second trained machine-learning model, a plurality of vectors that correspond to the respective rows; combining, with the computer, the vectors that correspond to the respective rows of the first and second datasets into first and second matrices, respectively; training, with the computer, an ANN index with the second matrix to form the trained ANN index; and querying, with the computer, the trained ANN index with the first matrix to produce the row map.

In one or more embodiments, the method further comprises receiving a validation signal that approves the column discovery. In one or more embodiments, the method further comprises receiving a rejection signal that rejects the column discovery; and receiving one or more column-edit input signals to modify the column discovery. In one or more embodiments, the method further comprises receiving a validation signal or a rejection signal that approves or rejects, respectively, the combined dataset.

Another aspect of the invention is directed to a computer system comprising: a display screen; and a computer comprising one or more processors; and non-volatile memory operatively coupled to the processor. The non-volatile memory stores computer-readable instructions that, when executed by the processor(s), cause the processor(s) to: receive first and second datasets; perform column discovery on the first and second datasets using a first trained machine-learning model to produce a column map that indexes one or more columns in the first dataset to one or more columns in the second dataset; perform row discovery on the first and second datasets using a second trained machine-learning model, a trained approximate nearest neighbor (ANN) index, and the column map to produce a row map that indexes one or more rows in the first dataset to one or more rows in the second dataset; combine the first and second datasets using the column map and the row map to form a combined dataset; and display the combined dataset on the display screen, the display screen electrically coupled to the computer.

In one or more embodiments, the processor(s) include a column-discovery processor and first and second pre-processors, the discovery processor having an input that is electrically coupled to a respective output of the first and second pre-processors. In one or more embodiments, the computer-readable instructions cause the column-discovery processor to train and fit a first machine-learning model on a corpus of concatenated n-grams of dataset values taken along a respective column dimension of respective columns of the first and second datasets to form the first trained machine-learning model. In one or more embodiments, the computer-readable instructions cause the first and second pre-processors to: convert the dataset values in a subset of columns in the first and second datasets to respective text strings; and convert each text string to one or more n-grams, each n-gram having n characters from the respective text string, where n is an integer of at least 2; and the computer-readable instructions further cause the column-discovery processor to: concatenate the n-gram(s) of each text string along the respective column dimension of the respective columns to form the corpus of concatenated n-grams; produce, using the first machine-learning model, a plurality of vectors that correspond to the respective columns; combine the vectors that correspond to the respective columns of the first and second datasets into first and second matrices, respectively; determine similarity metrics for the first and second matrices, wherein each similarity metric represents a quantitative similarity between the dataset values in a respective first-dataset column and the dataset values in a respective second-dataset column; determine whether any of the similarity metrics is higher than a threshold similarity metric; and add, for each similarity metric that is higher than the threshold similarity metric, a respective column index to the column map, the respective column index indicating an association between the respective first-dataset column and the respective second-dataset column.

In one or more embodiments, the processor(s) include first and second pre-processors, a row-embedding processor, an index-creation processor, and a query-index processor, and the computer-readable instructions cause the first and second pre-processors to: convert the dataset values in a subset of columns in the first and second datasets to respective text strings; convert each text string to one or more n-grams, each n-gram having n characters from the respective text string, where n is an integer of at least 2. The computer-readable instructions cause the row-embedding processor to: concatenate the n-gram(s) of each text string along a respective row dimension of respective rows of the first and second datasets to form a corpus of concatenated n-grams; train and fit a second machine-learning model on the corpus of concatenated n-grams of dataset values to form the second trained word vectorizer; produce, with the second trained word vectorizer, a plurality of vectors that correspond to the respective rows; combine the vectors that correspond to the respective rows of the first and second datasets into first and second matrices, respectively. The computer-readable instructions cause the index-creation processor to train and fit an ANN index with the second matrix to form the trained ANN index. The computer-readable instructions cause the query-index processor to query the trained ANN index with the first matrix to produce the row map.

In one or more embodiments, the computer-readable instructions further cause the processor(s) to: receive a rejection signal that rejects the column discovery; receive one or more column-edit input signals to modify the column discovery; and modify the column discovery based on the column-edit input signal(s).

Another aspect of the invention is directed to a computer-implemented method comprising: receiving, with a computer, first and second datasets; performing, with the computer, column discovery on the first and second datasets using a first trained machine-learning model that generates first vector embeddings to produce a column map that indexes one or more columns in the first dataset to one or more columns in the second dataset; performing, with the computer, row discovery on the first and second datasets using a second trained machine-learning model that generates second vector embeddings, a trained approximate nearest neighbor (ANN) index, and the first vector embeddings to produce a row map that indexes one or more rows in the first dataset; displaying, on a display screen electrically coupled to the computer, a first output table that represents matched rows in the first and second datasets; receiving one or more input signals that identify incorrect row matches and correct row matches in the first output table; training a third machine-learning model with a training dataset that includes the incorrect row matches, the correct row matches, and the column map to form a trained third machine-learning model; performing, with the computer, row discovery on the first and second datasets using the trained third machine-learning model; displaying, on the display screen, a second output table that represents matched rows in the first and second datasets based on the trained third machine-learning model; and storing a combined dataset in computer memory, the combined dataset formed using the trained third machine-learning model.

In one or more embodiments, the method further comprises receiving one or more input signals that identify incorrect row matches and correct row matches in the second output table; updating a training of the trained third machine-learning model with an updated training dataset that includes the incorrect row matches and the correct row matches from the second output table to form an updated trained third machine-learning model; performing, with the computer, row discovery on the first and second datasets using the updated trained third machine-learning model; and displaying, on the display screen, a third output table that represents matched rows in the first and second datasets based on the updated trained third machine-learning model, wherein the combined dataset is formed using the updated trained third machine-learning model.

In one or more embodiments, the method further comprises receiving, with a computer, third and fourth datasets that have the same columns as the first and second datasets, respectively; performing, with the computer, row discovery on the third and fourth datasets using the updated trained third machine-learning model; displaying, on the display screen, a fourth output table that represents matched rows in the third and fourth datasets based on the updated trained third machine-learning model; and storing a second combined dataset in computer memory, the second combined dataset including the matched rows in the third and fourth datasets.

BRIEF DESCRIPTION OF THE DRAWINGS

For a fuller understanding of the nature and advantages of the concepts disclosed herein, reference is made to the detailed description of preferred embodiments and the accompanying drawings.

FIG. 2 illustrates an example pair of input datasets or tables according to an embodiment.

FIG. 4A illustrates an example of datasets values of columns that are converted to text strings.

FIG. 4B illustrates an example of converting the text strings illustrated in FIG. 4A to lower-case text strings.

FIG. 5 illustrates an example of converting the lower-case text strings illustrated in FIG. 4B to a series of n-grams.

FIG. 6 illustrates an example of concatenating the n-grams illustrated in FIG. 5 along a respective column dimension.

FIG. 8A illustrates an example similarity matrix according to an embodiment.

FIG. 8B illustrates an example column map or index according to an embodiment.

FIG. 8C illustrates an example column map or index according to another embodiment.

FIG. 11 illustrates an example of concatenating the n-grams illustrated in FIG. 5 along a respective row dimension.

FIG. 15 illustrates an example output table according to an embodiment.

FIG. 19 illustrates an example XML file excerpt that includes identifier attributes according to an embodiment.

DETAILED DESCRIPTION

Column discovery and row discovery are performed, in a computer-implemented method, on input datasets using trained machine-learning models to produce indices of the respective columns and respective rows from each input dataset that are matches or similar to one another. The input datasets are merged or joined using the indices.

Figure 1:
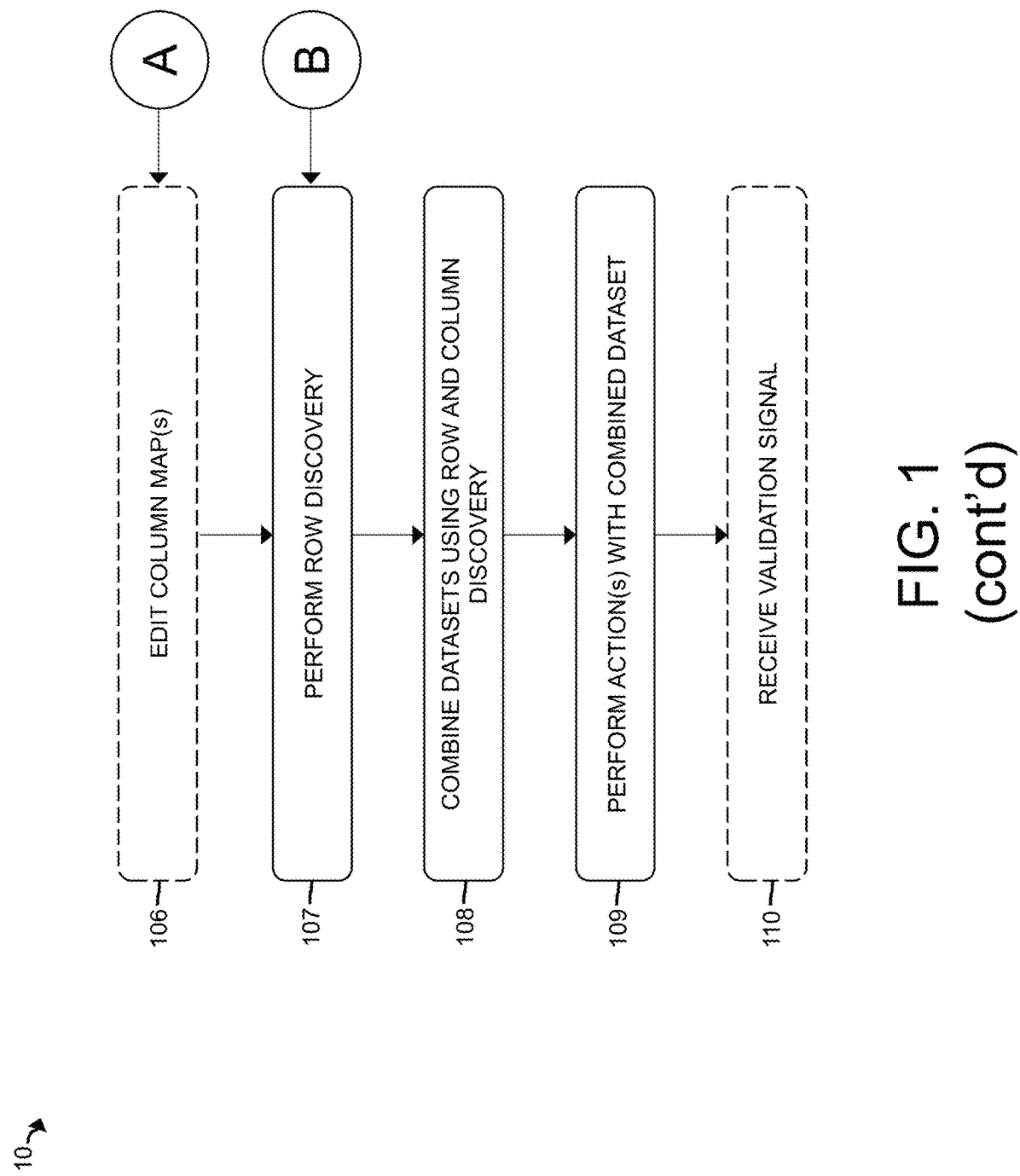
FIG. 1 is a flow chart of a computer-implemented method for unsupervised dataset joining, merging, and/or matching according to an embodiment.

FIG. 1 is a flow chart of a computer-implemented method 10 for unsupervised dataset joining, merging, and/or matching according to an embodiment. In step 101, two or more input datasets are received. The input datasets can include tables, databases, spreadsheets, lists, data files (e.g., comma-separated value (CSV) files, extensible markup language (XML) files, JavaScript Object Notation (JSON) files, etc.), and/or other datasets. The input datasets can have the same format, different formats, or a combination thereof. One or more subsets or "columns" of data in each input dataset has/have the same or similar data, but there may be differences between the data and/or column headings that prevent the columns from being joined, merged, and/or matched using existing methods.

It is noted that a "column" of data is used as shorthand for the conceptual organization of data stored in tables, spreadsheets, databases, and/or other datasets. For example, a column of data can represent a grouping of data using a common key. Embodiments of the invention are applicable and generalizable to other conceptual organizations of data, such as data organized in rows, data organized in multi-dimensional data structures, or data organized in other structures or arrangements. Therefore, discussions or illustrations showing rows, columns, or similar visual or conceptual depictions are made in that spirit where one of skill in the art will understand the generalization of these concepts to actual computer-based data storage and processing systems and methods.

FIG. 2 illustrates an example pair of input datasets or tables 20 and 22 according to an embodiment. The horizontal dashed lines 210 indicate related rows of the tables 20, 22 and show how the content of the rows can be challenging to match using simple methods employed in the prior art. For example, the first table 20 includes a first column 201 titled "First" that includes the first names of multiple people and a second column 202 titled "Last" that includes the respective last names of multiple people, while the second table 22 includes a first column 221 titled "Name" that includes the first and last names of multiple people with a comma separating the first and second name of each person in a given row. The first and last names in column 201 and 202, respectively, are in capital letters, while only the first letter of the first and last names of each person is capitalized in column 221. In addition, the first table 20 includes a third column 203 titled "Postal Code" with a six-digit number in each row while the second table 22 includes a second column 222 titled "Postalcode" with two three-digit numbers separated by a dash.

In optional step 102, a subset of data is taken from each input dataset. The subset of data can be a random sampling of columns from each input dataset. When input datasets are not in the form of a table, the columns can be identified as a grouping of data using a common key or identifier. Step 102 can be performed when the input datasets are large and there is insufficient memory (e.g., random-access memory (RAM)) in the computer to perform column discovery using all data in the input datasets.

In step 103, column discovery is performed on the data subsets taken in optional step 102. When step 102 is not performed, column discovery is performed on all data in the input datasets. In column discovery, the computer produces a column map that represents the likelihood that there is a relationship or a similarity between one or more columns from each input dataset. The likelihood can be expressed quantitatively such as a similarity metric, a confidence value, and/or another quantitative value (in general, similarity metric). The similarity metric can be compared with a threshold similarity metric to determine whether the columns are similar or dissimilar.

The discovered columns for each dataset can be graphically presented (e.g., on a display screen that is electrically coupled to the computer) to a human operator who can validate or reject the discovered columns. The graphical presentation to the user can include the column map (e.g., similarity metric(s)) and can optionally include the column(s) from each input dataset that were analyzed during column discovery. Alternatively, a link can be provided to the column(s) from each input dataset that were analyzed during column discovery.

When column discovery in step 103 is performed on the data subsets taken in optional step 102, the method proceeds to optional step 104 where column discovery is performed on the remainder of the input datasets. Optional step 104 is performed if/when optional step 102 is also performed (e.g., if a subset of data is taken from each input dataset in optional step 102, the remainder of the data is taken from each input dataset in optional step 102). Optional step 104 is performed in the same manner as step 103.

When an optional rejection signal is received (optional step 105=no), a human operator (e.g., a human in the loop) can optionally manually edit the column map (e.g., by providing one or more column-edit input signals) in optional step 106 (via placeholder A). For example, when the column map includes a high similarity metric that indicates that two columns match, the human operator can manually lower the similarity metric for those two columns to indicate that they do not match. Alternatively, the human operator can delete or remove the mapping between the two columns without adjusting the similarity metric. Conversely, when the column map includes a low similarity metric that indicates that two columns do not match, the human operator can manually increase the similarity metric for those two columns to indicate that they do match. Alternatively, the human operator can add a mapping between the two columns without adjusting the similarity metric.

After column discovery is edited in optional step 106, after an optional validation signal is received (optional step 105=yes), or after step 103 (if optional steps 104-106 are not performed, the method 10 proceeds to step 107. The method proceeds from optional step 105=yes or from step 103 to step 107 via placeholder B. In step 107, row discovery is performed on the input datasets. In row discovery, the computer produces a row map that represents the likelihood (e.g., using a similarity metric or another quantitative metric) that there is a relationship or a similarity between the data values in each row of the input datasets according to the column maps.

In step 108, the input datasets are merged or combined using the row and column discovery where the column discovery is provided as input to the row discovery. The output of step 108 is a merged or combined dataset.

In step 109, the computer performs one or more actions with the combined dataset. For example, the computer can store the combined dataset in computer memory that is operably coupled to the computer. In another example, the computer can display the combined dataset (e.g., on the display screen). In some embodiments, the merged/combined dataset can be displayed with a confidence/similarity score of the model in the prediction and the prediction value (match or no match) from the machine learning model, such as table 1500 in FIG. 15. The computer can optionally prompt the user for feedback, such as to edit the columns and/or rows in the combined dataset.

In optional step 110, a validation signal (or a rejection signal) can be received regarding the merged/combined dataset. A rejection signal can cause received for certain row and/or column matches, which can cause the computer to remove the rejected column(s) and/or row(s) from the final merged/combined dataset. The computer can store the merged/combined dataset in computer memory when the validation signal is received.

Figure 3:
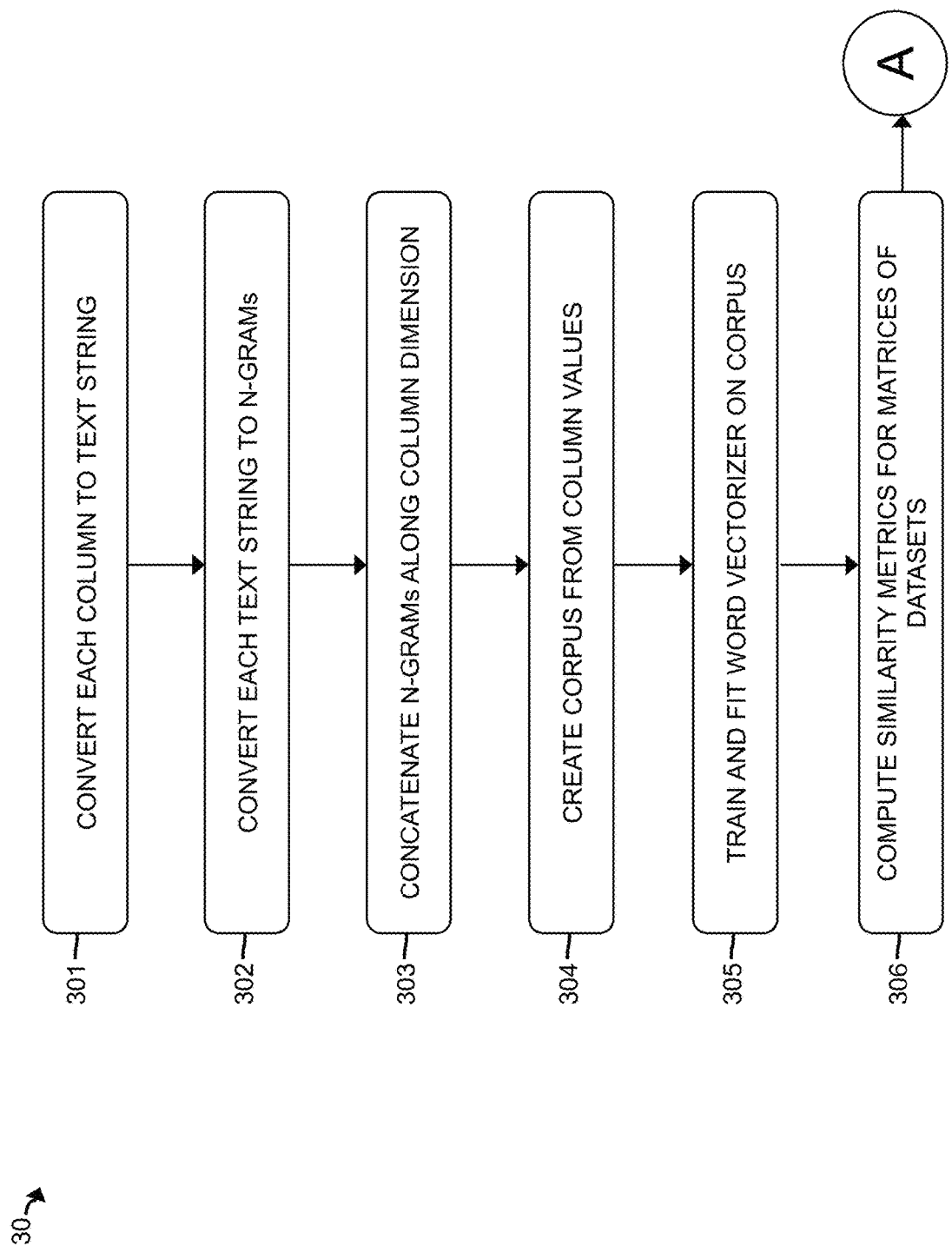
FIG. 3 is a flow chart of a computer-implemented method for performing column discovery on input datasets according to an embodiment.

FIG. 3 is a flow chart of a computer-implemented method 30 for performing column discovery on input datasets according to an embodiment. Steps 103 and 106 can be performed using method 30.

In step 301, the values of each column are converted to a text string. Each text string can be converted to lower-case letters. An example of the output of step 301 is illustrated in FIGS. 4A and 4B. Using the first and second tables 20, 22 as an example, the values of each column are converted to text strings in FIG. 4A. The column headers can optionally be converted to text strings in step 301. The text strings in each table 20, 22 are converted to fully lower-case text strings in FIG. 4B.

In step 302, each text string is converted into one or more n-grams. An n-gram is a group of n-characters long sequences of a word where n is an integer greater than or equal to 2. An example of the output of step 302 as applied to tables 20, 22 is illustrated in FIG. 5 where n is equal to 3.

In step 303, the n-grams are concatenated along the column dimension. An example of the output of step 303 as applied to tables 20, 22 is illustrated in FIG. 6 where the n-grams in a given column are combined or concatenated along the column dimension (e.g., compared to FIG. 5).

Each column in tables 20, 22 has only one row with the value of the row equal to the concatenated n-grams for the respective column.

In step 304, a corpus of n-grams is created. The corpus of n-grams includes the concatenated n-grams from each column for both datasets. For example, the values of the rows in each table, from the output of step 303, can be concatenated with a comma (or another character) separating each column of concatenated n-grams. An example corpus for tables 20, 22 is {"jon es" "wil lia ms", "ang ela" "bla ke", "210 012" "210 002", "jon es, ang ela" "wil lia m, bla ke", "210-012" "210-002"} where a comma between the closed and open quotation marks indicates a different column. The data from each table does not need to be separated in this step.

In step 305, a word vectorizer (e.g., a word-level embedding model is created using machine learning. Example of machine learning include neural networks, traditional machine learning techniques, and/or other methods. The word vectorizer is trained and fit on the n-gram corpus (formed in step 304). The trained word vectorizer can transform the column-wise n-grams (concatenated n-grams produced in step 303) to produce a vector embedding for the columns of n-grams. The vector embedding represents or captures the distribution of n-grams (or words) present in the column of data. In some embodiments, a dimensionality-reduction model, technique, or method can be trained and fit to reduce the embedding vector size.

Figure 7:
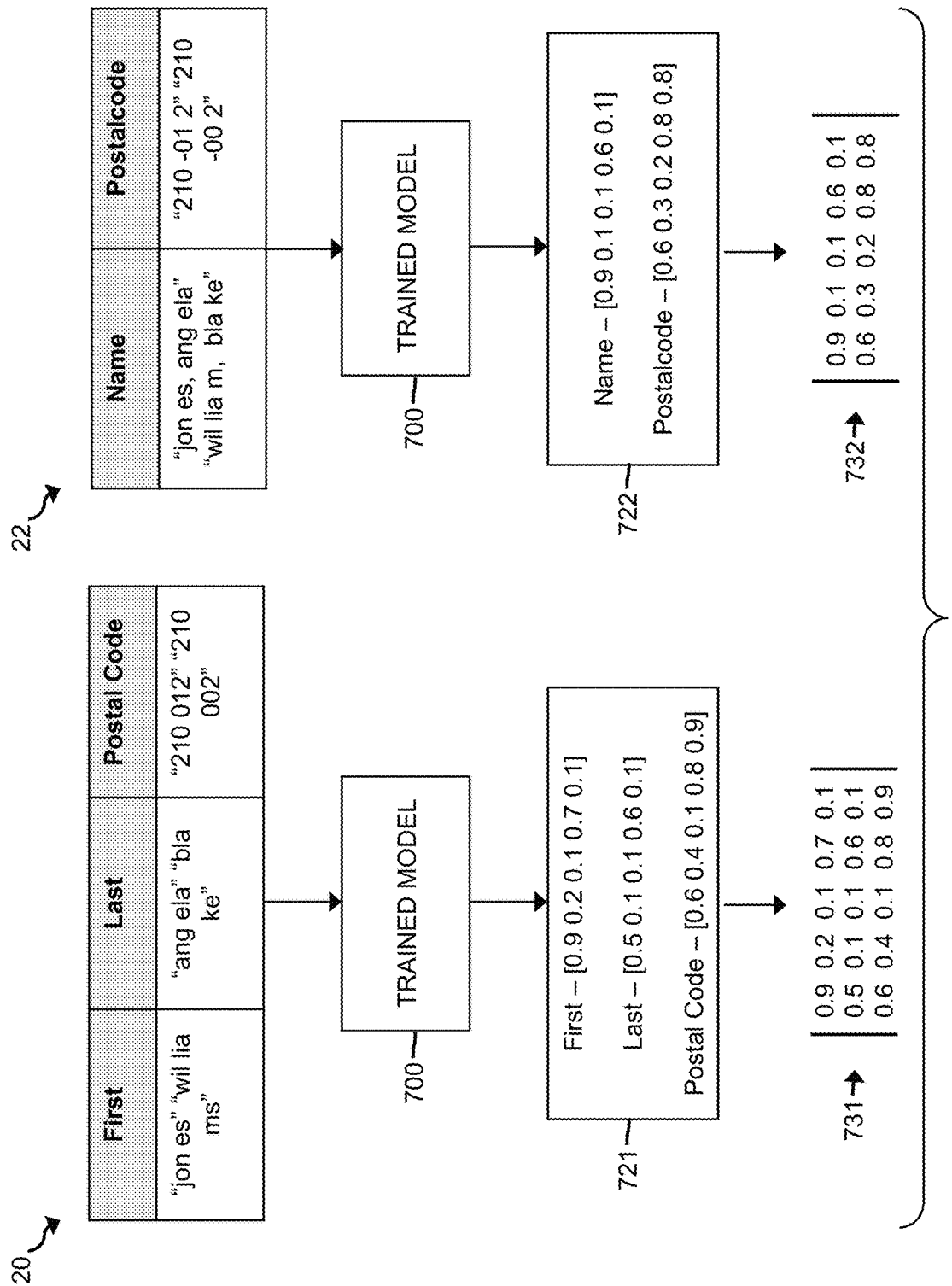
FIG. 7 illustrates an example block diagram of training and fitting a word vectorizer model to perform column discovery according to an embodiment.

An example of step 305 as applied to tables 20, 22 is illustrated in FIG. 7. The concatenated n-grams of each table 20, 22 are provided as inputs to the trained model 700 (e.g., trained word-level embedding model) that outputs a vector for each column of each table. The vector embedding represents or captures the distribution of n-grams (or words) present in the column of data. For example, the trained model 700 produces three vectors 721 (for columns "First," "Last," and "Postal Code") for the concatenated n-grams from table 20. In addition, the trained model 700 produces two vectors 722 (for columns "Name" and "Postalcode") for the concatenated n-grams from table 22.

The vectors for each table or dataset can be stacked or combined to form a respective matrix 731, 732 for each table.

In step 306, similarity metrics are calculated between the matrices formed in step 305. The similarity metric can be or include a cosine similarity between the matrices or vectors. A similarity matrix 800 representing the similarity metrics between matrices 731, 732 is illustrated in FIG. 8A. The values in the similarity matrix 800 represent the similarity between columns from each table 20, 22. For example, the first row corresponds to the "First" column in the first table 20 and the values 0.99 and 0.81 represent the similarity of the "First" column in the first table 20 with "Name" and "Postalcode" columns, respectively, in the second table 22.

In step 307 (via placeholder A), the similarity metrics calculated in step 307 are compared to a threshold similarity metric. For each similarity metric that is higher than the threshold similarity metric (i.e. step 308=yes), the two columns of data that are represented by that similarity metric are added to a column mapping in step 309. The column mapping indicates which column from the first dataset corresponds to or matches which columns (If any) from the second dataset. For each similarity metric that is lower than or equal to the threshold similarity metric (i.e. step 308=no), that similarity metric is disregarded or discarded in step 310 and the column mapping is not modified. Disregarding/discarding the similarity metric indicates that there is no relationship, correspondence, or similarity between the given columns from the first and second datasets. The column mapping can be stored in computer memory operatively coupled to the computer.

In some embodiments, a column map or index 810 can be produced, for example as illustrated in FIG. 8B. The column index can include a "1" for each similarity metric value that is higher than the threshold similarity metric and a "0" for each similarity metric value that is lower than or equal to the threshold similarity metric. In column index 810, each row represents respective columns ("First," "Last," "Postal Code") of the first table 20 and each column represents respective columns ("Name," "Postalcode") of the second table 22. The first column of column index 810 is [1, 1, 0] which indicates that the "First" and "Last" columns in the first table 20 correspond to the "Name" column in the second table 22. There is no correlation between the "Postal Code" column in the first table 20 with the "Name" column in the second table 22. The second column of column index 810 is [0, 0, 1] which indicates that the "Postal Code" column in the first table 20 corresponds to the "Postalcode" column in the second table 22. There is no correlation between the "First" and "Last" columns in the first table 20 with the "Postalcode" column in the second table 22. It is noted that if the inputs were reversed (i.e., the inputs were second and first tables 22, 20 instead of first and second tables 20, 22), the resulting output in the column map or index 820, as illustrated in FIG. 8C, would be {"Name": ["First", "Last"], "Postalcode": ["Postal Code"]}. In column index 820, each row represents respective columns ("Name," "Postalcode") of the second table 22 and each column represents respective columns ("First," "Last," "Postal Code") of the first table 20.

Figure 9:
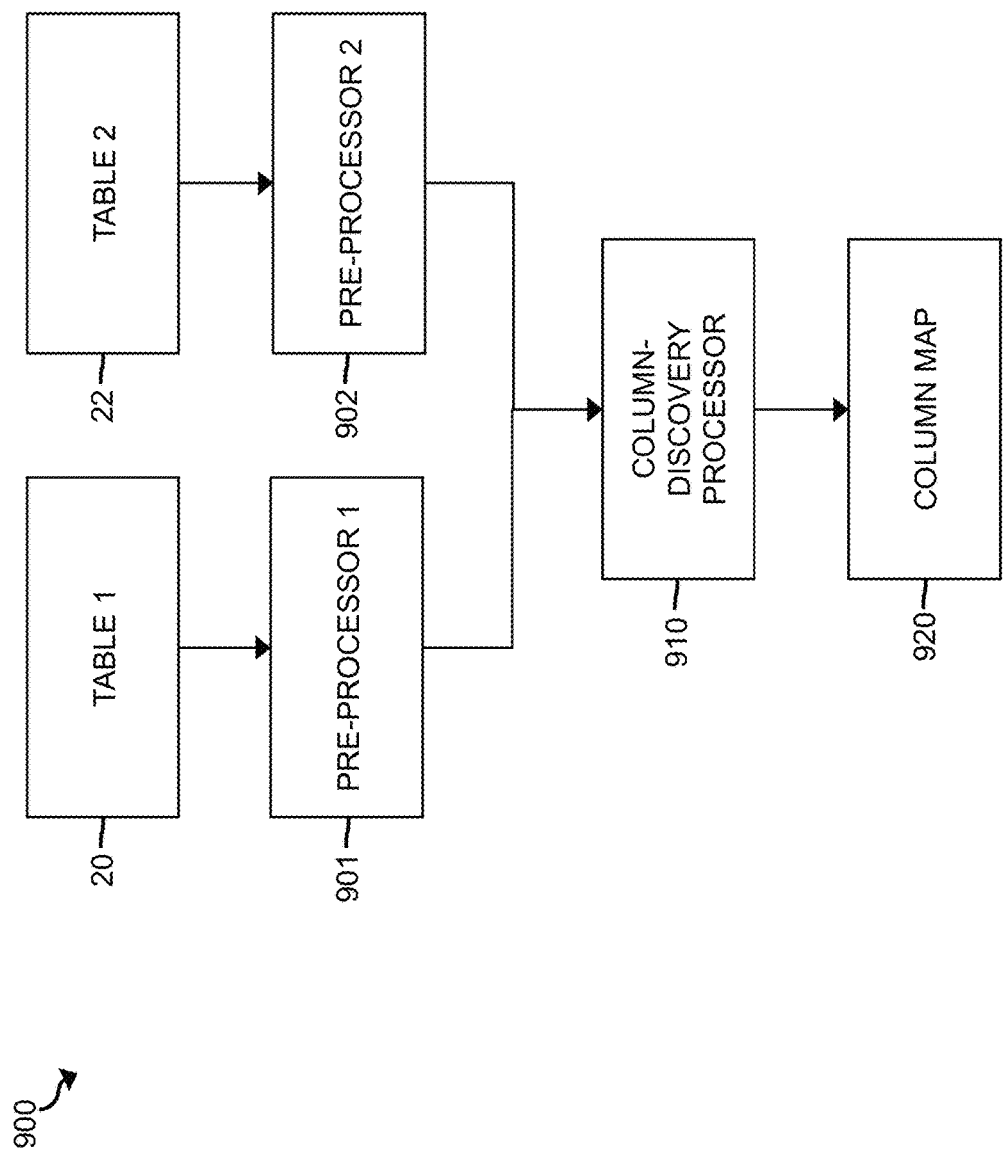
FIG. 9 is a block diagram of computer processors for performing column discovery according to an embodiment.

FIG. 9 is a block diagram of computer processors 900 for performing column discovery according to an embodiment. The processors 900 includes first and second pre-processors 901, 902 and a column discovery processor 910. The inputs of the first and second pre-processors 901, 902 receive the first and second tables 20, 22, respectively, and/or other datasets. Each pre-processor 901, 902 is configured to perform steps 301 and 302 on the respective input table 20, 22. For example, pre-processor 901 performs step 301 of converting each column to a text string (e.g., a lower-case text string) and step 302 of converting each text string to a series of n-grams. The output of each pre-processor 901, 902 is a respective n-gram converted table.

The column discovery processor 910 is configured to receive first and second n-gram converted tables that correspond to the first and second tables 20, 22, respectively. The column discovery processor is configured to perform steps 303-310 using the first and second n-gram converted tables. The output of the column discovery processor 910 is a column map 920 that indicates the relationship (if any) and/or similarity between the columns of the input tables/datasets (e.g., first and second tables 20, 22).

Figure 10:
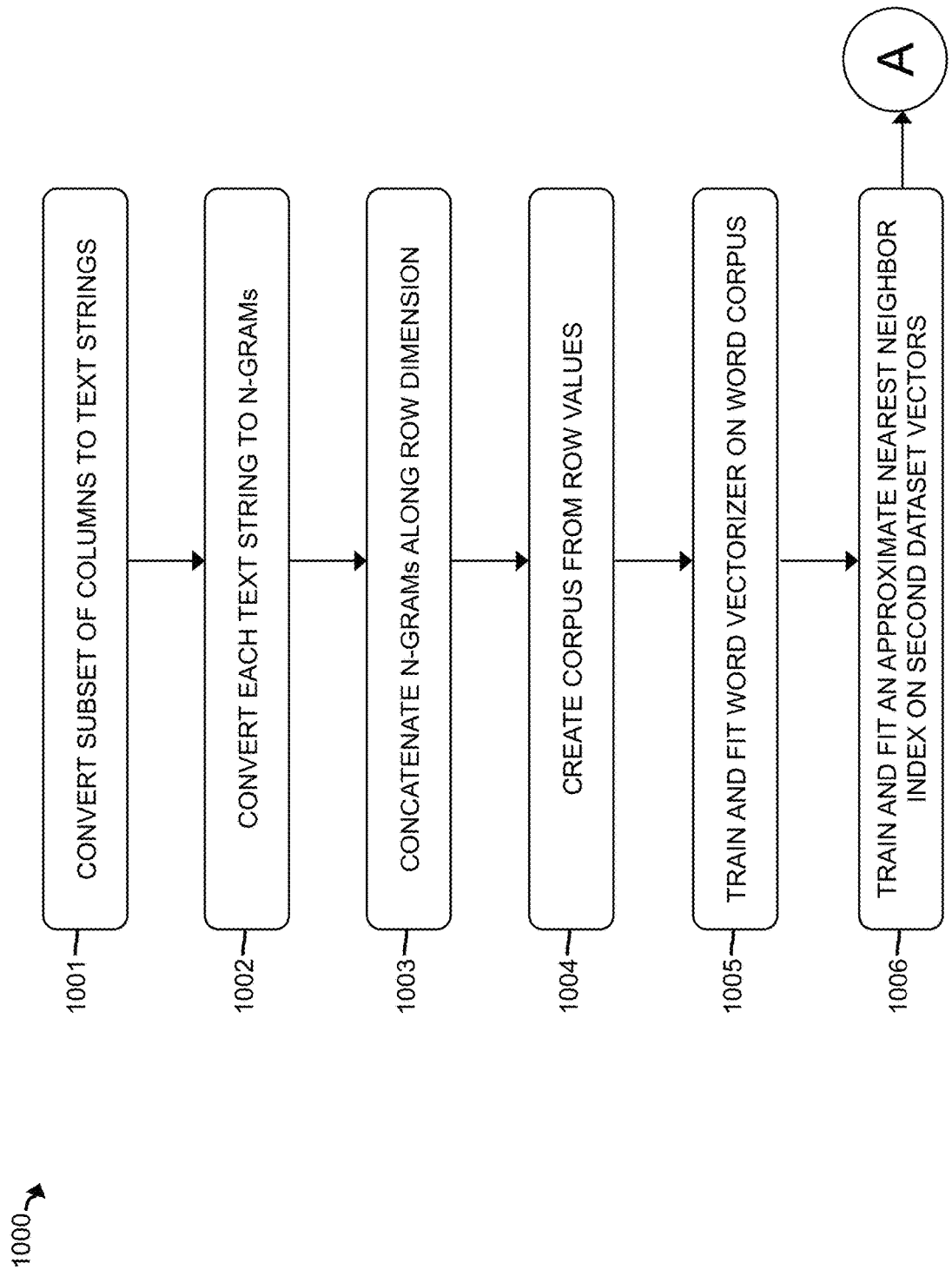
FIG. 10 is a flow chart of a computer-implemented method for performing row discovery in a dataset according to an embodiment.
Figure 10:
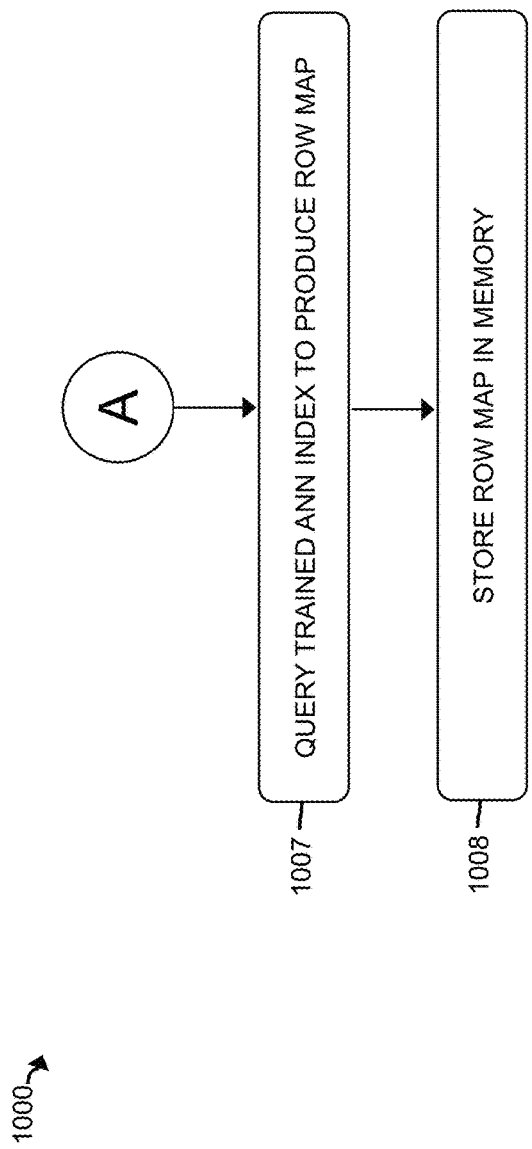

FIG. 10 is a flow chart of a computer-implemented method 1000 for performing row discovery in a dataset according to an embodiment. Step 107 can be performed using method 1000. Rows in datasets that are XML files or databases can be identified by using common identifier attributes. For example, in the XML file excerpt illustrated in FIG. 19, the identifier attributes <FirstName>, <LastName>, <ContactNo>, <Email>, <City>, <State>, and <Zip> can represent columns of data and the data (e.g., Joh, Doe, etc.) can represent the rows of data.

In step 1001, the values of a subset of the columns from each dataset are converted to a text string. Each text string can be converted to lower-case letters.

In step 1002, each text string is converted into one more n-grams. An n-gram is a group of n characters long where n is an integer greater than or equal to 2. The size of the n-grams (value of n) in step 1002 can be the same as or different than size of the n-grams (value of n) in step 302. Steps 1001 and 1002 can be the same as steps 301 and 302, respectively. In some embodiments, the result of steps 301 and 302 can be stored for use in method 1000 in which case steps 1001 and 1002 do not need to be performed.

In step 1003, the n-grams are concatenated along the row dimension. An example of the output of step 1003 as applied to tables 20, 22 is illustrated in FIG. 11 where the n-grams in a given row are combined or concatenated along the row dimension (e.g., compared to FIG. 5). Each row in tables 20, 22 has only one column with the value of each row equal to the concatenated n-grams for the respective row.

In step 1004, a corpus of n-grams is created. The corpus of n-grams includes the concatenated n-grams from each column for both datasets. For example, the values of the rows in each table, from the output of step 303, can be concatenated with a comma (or another character) separating each column of concatenated n-grams. An example corpus for tables 20, 22 is {"jon es" "ang ela" "210 012", "wil lia ms" "bla ke" "210 002", "jon es, ang ela" "210-012", "wil lia m, bla ke" "210-002"} where a comma between the closed and open quotation marks indicates a different row. The corpus does not need to differentiate between the first and second tables 20, 22.

In step 1005, a word vectorizer (e.g., a word-level embedding model is created using machine learning. Example of machine learning include neural networks, traditional machine learning techniques, and/or other methods. The word vectorizer—is trained and fit on the n-gram corpus (formed in step 1104). The trained word vectorizer can transform the column-wise n-grams (concatenated n-grams produced in step 303) to produce a vector embedding for the columns of n-grams. The vector embedding represents or captures the distribution of n-grams (or words) present in the column of data. In some embodiments, a dimensionality-reduction model, technique, or method can be trained and fit to reduce the embedding vector size.

Figure 12:
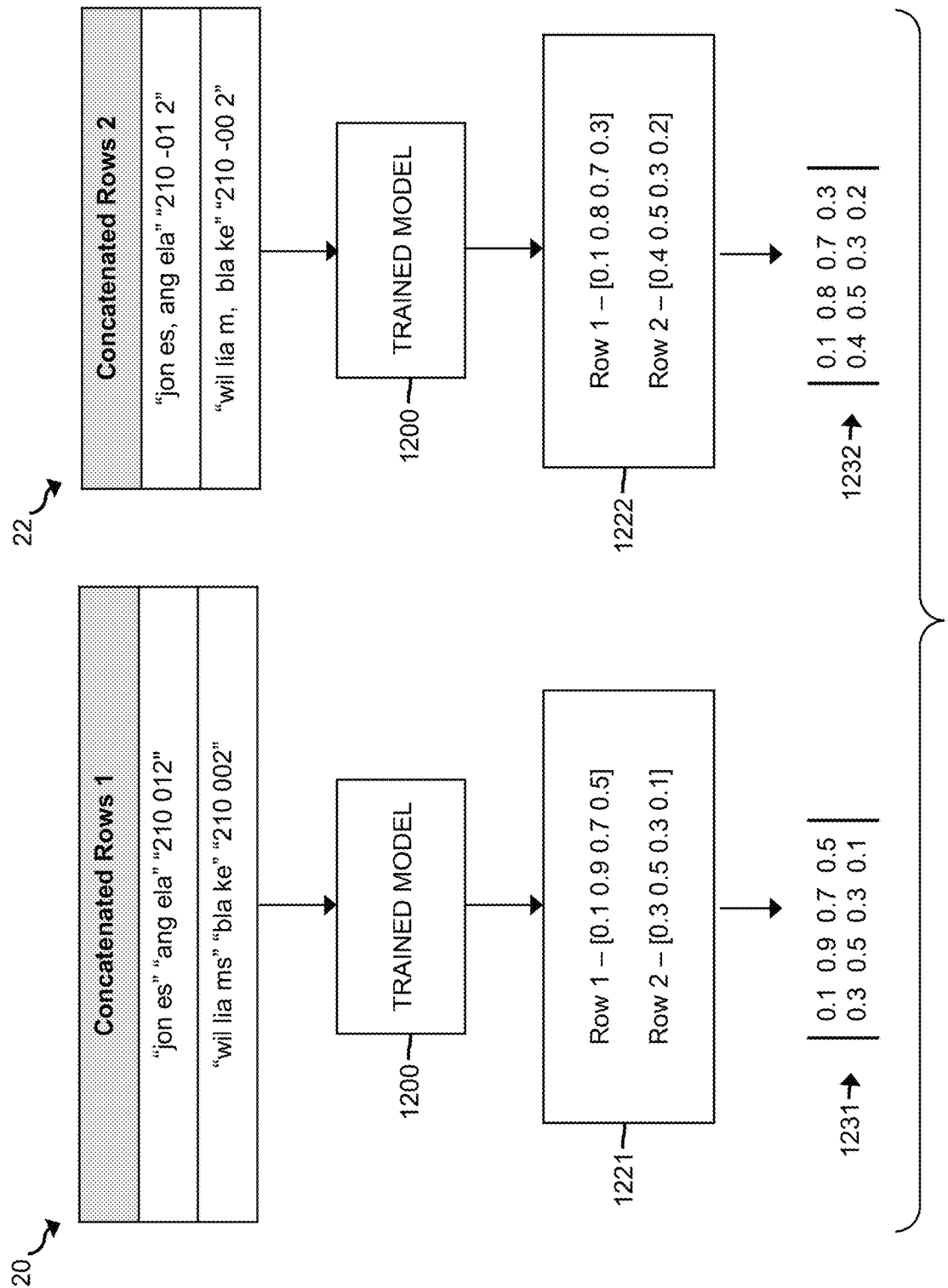
FIG. 12 illustrates an example block diagram of training and fitting a word vectorizer model to perform row discovery according to an embodiment.

An example of step 1005 as applied to tables 20, 22 is illustrated in FIG. 12. The concatenated n-grams of each table 20, 22 are provided as inputs to the trained machine-learning model 1200 (e.g., a trained vectorizer) that outputs a vector for each row of each table. For example, the trained machine-learning model 1200 produces two vectors 1221 (for each row of concatenated n-grams from table 21) for the concatenated n-grams from table 20. In addition, the trained machine-learning model 1200 produces two vectors 1222 (for each row of concatenated n-grams from table 22) for the concatenated n-grams from table 22. The vectors 1222 for each row represent the distribution of n-grams (or words) present in the respective row.

The vectors for each table or dataset can be stacked or combined to form a respective matrix 1231, 1232 for each table.

Figure 13:
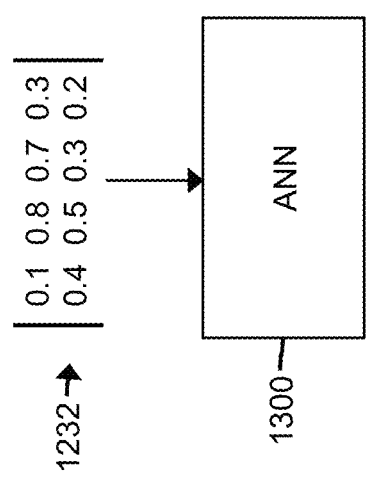
FIG. 13 is a block diagram of training an approximate nearest neighbor index according to an embodiment.

In step 1006, an approximate nearest neighbor (ANN) index is trained with the second dataset vectors or matrix (e.g., matrix 1232). An ANN is a data structure used to efficiently retrieve k-nearest values in vector space to a given query vector. When training an ANN index, a similarity measure (cosine, $l_2$ distance, etc.) and a base data structure are selected (KD-Tree, Ball-tree, etc.). After selection of the similarity measure and the base data structure, the data structure is optimized when inserting the values from the training set to enable fast querying of vectors. An example of training an ANN 1300 using the second matrix 1232 is illustrated in FIG. 13.

In step 1007, the trained ANN index is queried using the first dataset vectors (or matrix (e.g., matrix 1231)) for one for one of the datasets to obtain an index or row map that indicates or predicts the relationship or matches between the rows of each input dataset (e.g., tables 20, 22). An example row index/map for tables 20, 22 is {0:0, 1:1} which indicates that the 0 index (first) row of the first table 20 corresponds to the 0 index (first) row of the second table 22, and that the 1 index (second) row of the first table 20 corresponds to the 1 index (second) row of the second table 22.

In an alternative embodiment, in step 1006 the ANN index can be trained with the first dataset vectors or matrix (e.g., matrix 1231) and in step 1007 the trained ANN index can be queried using the second dataset vectors (or matrix (e.g., matrix 1232)).

In step 1008, the row map/indices can be stored in computer memory operatively coupled to the computer.

Figure 14:
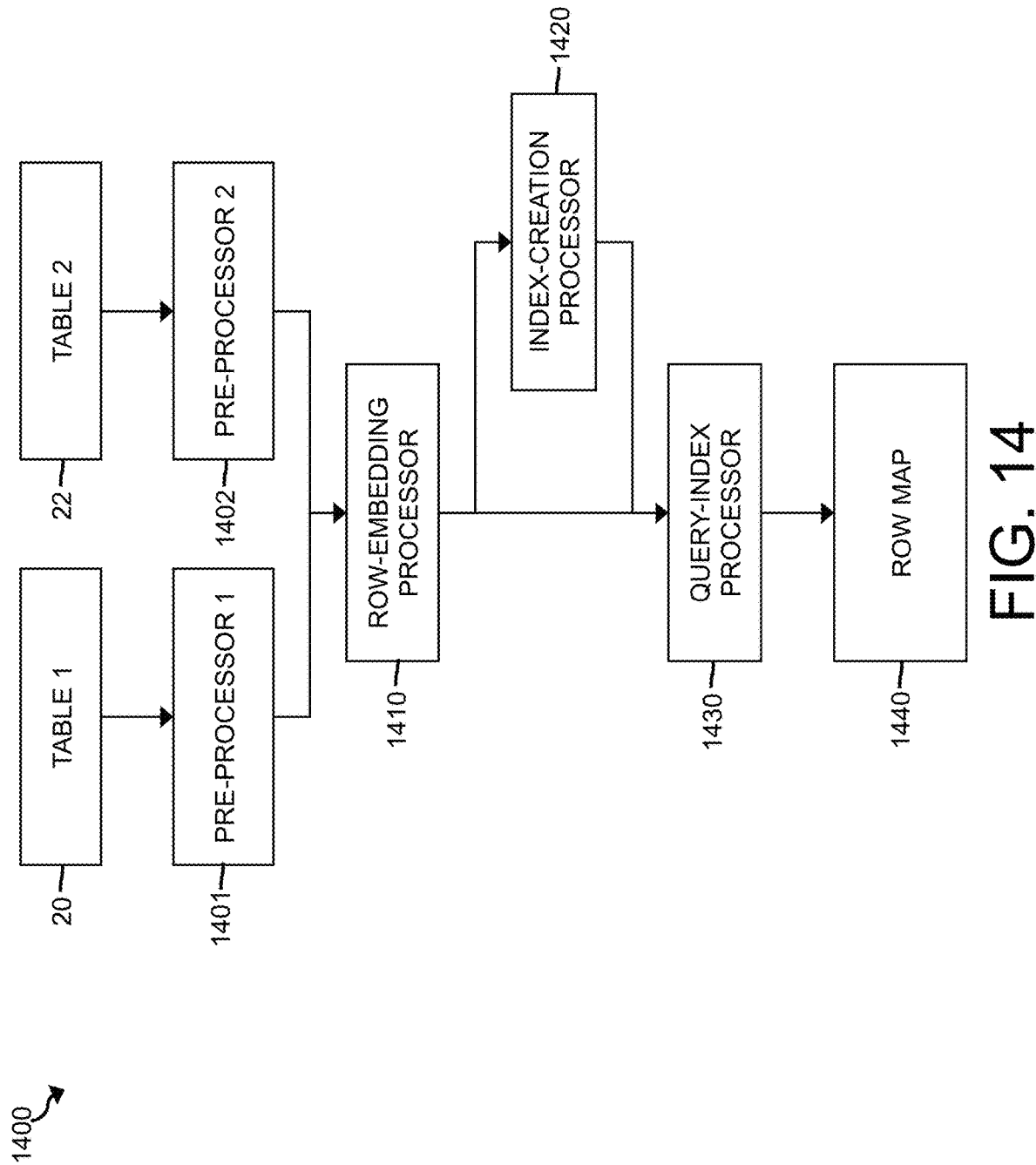
FIG. 14 is a block diagram of computer processors for performing row discovery according to an embodiment.

FIG. 14 is a block diagram of computer processors 1400 of a computer for performing row discovery according to an embodiment. The processors 1400 include first and second pre-processors 1401, 1402, a row-embedding processor 1410, and a query-index processor 1420. The inputs of the first and second pre-processors 1401, 1402 receive the first and second tables 20, 22, respectively, and/or other datasets. Each pre-processor 1401, 1402 is configured to perform steps 1001 and 1002 on the respective input table 20, 22. For example, pre-processor 1401 performs step 1001 of converting each column to a text string (e.g., a lower-case text string) and step 1002 of converting each text string to a series of n-grams. The output of each pre-processor 1001, 1002 is a respective n-gram converted table.

The row-embedding processor 1410 is configured to receive as inputs the first and second n-gram converted tables that correspond to the first and second tables 20, 22, respectively. The row-embedding processor 1410 is configured to perform steps 1003-1005 using the first and second n-gram converted tables. The output of the row-embedding processor 1410 includes first and second row-embedding tables that includes a respective vector for each row in the first and second n-gram converted tables, respectively. An example of the first and second row-embedding tables is vectors 1221, 1222 (FIG. 12), respectively.

The index-creation processor 1420 is configured to receive as inputs the vectors or matrix from the second dataset (e.g., vectors 1222 or matrix 1232). The index-creation processor 1420 is configured to perform step 1006 using the vectors or matrix from the second dataset. The output of the index-creation processor 1420 is a trained ANN.

The query-index processor 1430 is configured to receive as inputs the trained ANN from the index-creation processor 1420 and the vectors or matrix from the first dataset (e.g., vectors 1221 or matrix 1231), which is output from the row-embedding processor 1410. The query-index processor 1430 is configured to perform step 1007 and optional step 1008. Step 1007 is performed using the trained ANN and the vectors or matrix from the first dataset. The output of query-index processor 1430 is a row map 1440 that indicate which rows in each input dataset (e.g., input tables 20, 22) appear to be same or similar.

In an alternative embodiment, the index-creation processor 1420 can be configured to receive as inputs the vectors or matrix from the first dataset (e.g., vectors 1221 or matrix 1231) and perform step 1006 using the vectors or matrix from the first dataset. The query-index processor 1430 can be configured to receive as inputs the trained ANN from the index-creation processor 1420 and the vectors or matrix from the second dataset (e.g., vectors 1222 or matrix 1232), which is output from the row-embedding processor 1410. The query-index processor 1430 can be configured to perform step 1007 using the trained ANN and the vectors or matrix from the second dataset.

Figure 16:
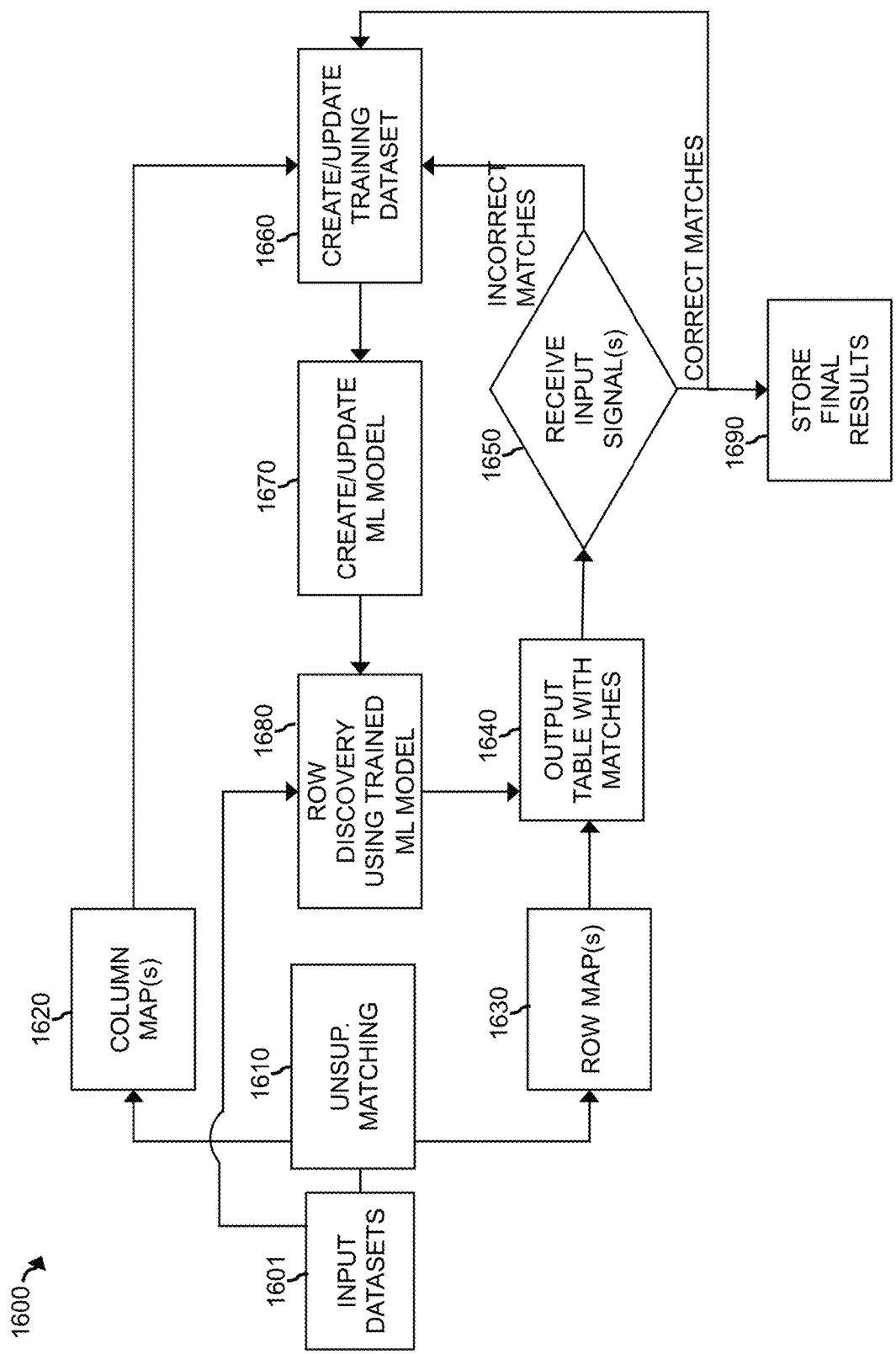
FIG. 16 is a block diagram of a computer-implemented method for supervised dataset joining, merging, and/or matching using a human-in-the-loop according to another embodiment.

FIG. 16 is a block diagram of a computer-implemented method 1600 for supervised dataset joining, merging, and/or matching using a human-in-the-loop according to another embodiment.

In step 1601, two or more input datasets are received. In step 1610, the rows and columns (or their respective equivalents) from the input datasets are matched in an unsupervised manner, for example according to method 10. The outputs of step 1610 are column map(s)/indices 1620 and row map(s)/indices 1630. The column map(s)/indices 1620 indicate which column(s) in each input dataset appear to be same or similar. The row map(s)/indices 1630 indicate which rows in each input dataset appear to be same or similar. Though human input may have provided to edit the column map(s)/indices 1620 and/or the row map(s)/indices 1630 (e.g., in steps 106 and/or 110 in method 10), method 10 is referred to as unsupervised because human input is not provided to the ML models.

In step 1640, the computer produces and displays an output table that represents some or all of the column and row maps/indices. For example, the output table can include columns and rows from each input datasets and a similarity score regarding the match of each row. The output table can be or appear the same as table 1500.

In step 1650, the computer receives one or more input signals regarding the accuracy of the output table. The input signals can be provided by a human operator of the computer (e.g., as a human-in-the-loop). The input signals can indicate whether any rows from each input dataset are incorrectly identified as potential matches and/or as potential non-matches. The input signals can also indicate whether any rows from each input dataset are correctly identified as potential matches and/or as potential non-matches. The output of step 1650 includes a list of rows that are correctly identified as matches and a list of rows that are incorrectly identified as matches.

In step 1660, the rows that are correctly identified as matches and the rows that are incorrectly identified as matches are used to create a training dataset for a new ML classifier. The training dataset also includes the column map(s) 1620.

In step 1670, a new ML classifier is trained using the training dataset. In 1680, the new ML classifier performs row discovery of the input datasets. After step 1670, the method 10 returns to step 1640 in a second loop where the computer produces and displays an output table that represents some or all of the column and row maps/indices using the row discovery from the new ML classifier.

In step 1650 (in the second loop), the computer receives one or more input signals regarding the accuracy of the output table. In step 1660, The rows that are correctly identified as matches and the rows that are incorrectly identified as matches are used to update the training dataset for the ML classifier. The training dataset also includes the column map(s) 1620.

In step 1670, the ML classifier is updated or retrained using the updated training dataset. In 1680, the updated ML classifier performs row discovery of the input datasets. This loop of steps 1640, 1650, 1660, 1670, and 1680 can continue until the input signals received in step 1650 indicate either (a) that all rows are matched correctly or (b) the user desires to end training of the ML classifier, at which point the final results, including the updated/trained ML classifier, are stored in computer memory in step 1690. The final results also include the column maps, the row maps, and/or a combined dataset that includes the matched columns and rows.

Figure 17:
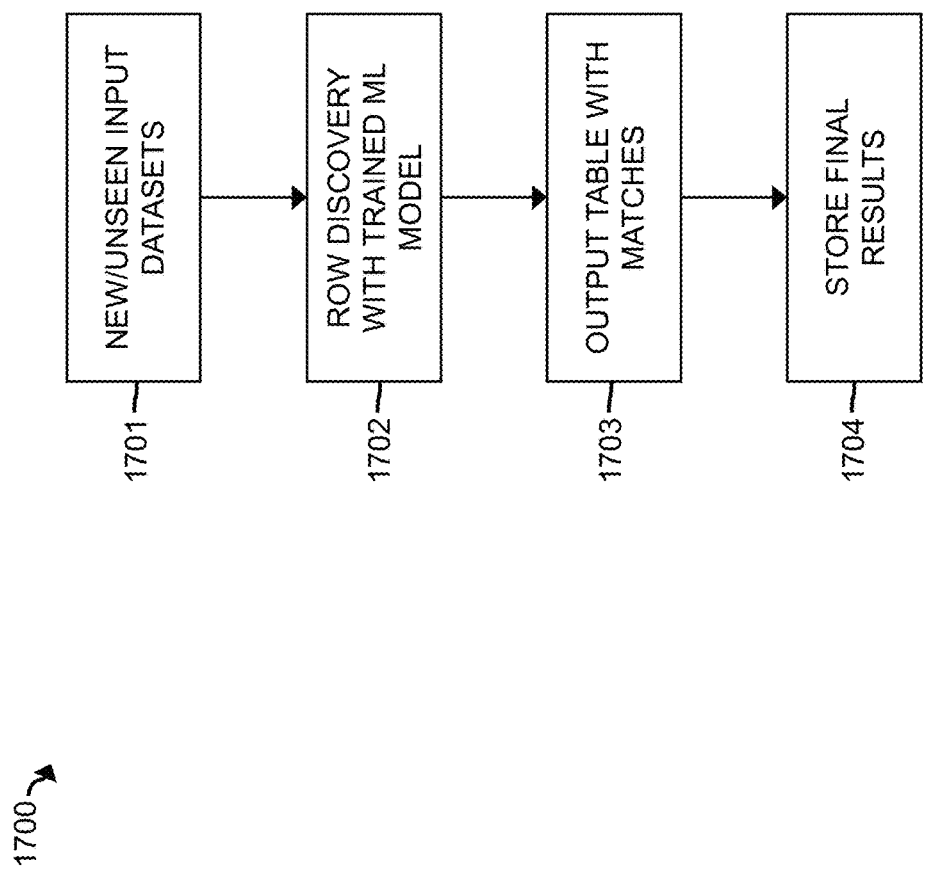
FIG. 17 is a flow chart of a computer-implemented method for unsupervised dataset joining, merging, and/or matching according to another embodiment.

FIG. 17 is a flow chart of a computer-implemented method 1700 for unsupervised dataset joining, merging, and/or matching according to another embodiment.

In step 1701, two or more new/unseen input datasets are received. The input datasets have the same columns as the input datasets used to train the ML classifier in method 1600 (e.g., in step 1670).

In step 1702, row discovery of the new input datasets is performed using the trained ML classifier from method 1600.

In step 1703, the computer produces and displays an output table that represents some or all of the column and row maps/indices. For example, the output table can include columns and rows from each input datasets and a similarity score regarding the match of each row. The output table can be or appear the same as table 1500.

In step 1704, the computer stores the final results in computer memory. The final results can include the column maps, the row maps, and/or a combined dataset that includes the matched columns and rows.

Figure 18:
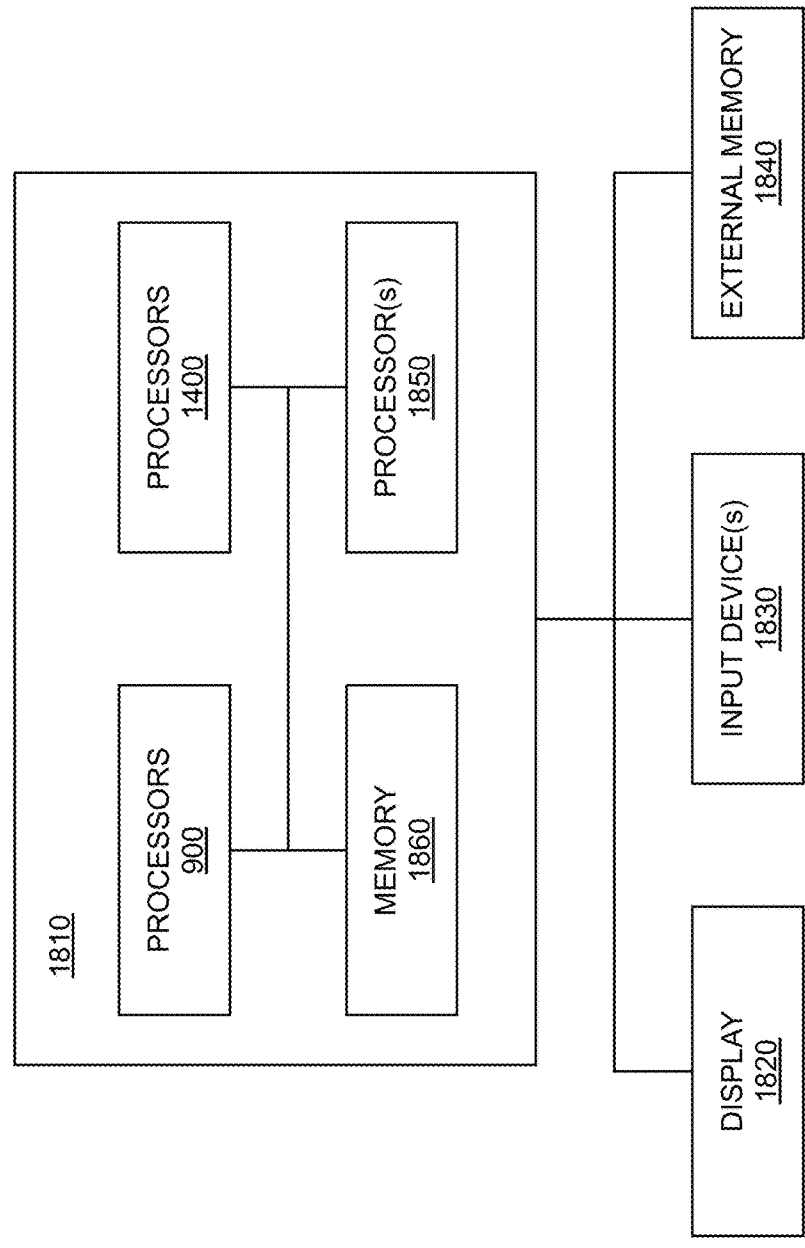
FIG. 18 is a block diagram of a computer system for dataset joining, merging, and/or matching according to an embodiment.

FIG. 18 is a block diagram of a computer system 1800 for dataset joining, merging, and/or matching according to an embodiment. The computer system 1800 includes a computer 1810, a display 1820, one or more input devices 1830, and an optional external memory 1840.

The computer 1810 includes the processors 900 (FIG. 9) for performing column discovery and the processors 1400 (FIG. 14) for performing row discovery. The computer 1810 can also include one or more additional processors 1850, such as one or more microprocessors, central processing units (CPUs), graphics processing units (GPUs), and/or other hardware processors. The processors 900, 1400, and 1850 can be in electrical communication with each other. In addition, The processors 900, 1400, and 1850 are in electrical communication with computer memory 1860 which can include non-volatile computer memory. The computer memory 1860 stores computer-readable instructions that cause the processors 900, 1400, and/or 1850 to perform the methods or one or more steps of the methods described herein (e.g., methods 10, 30, and/or 1000).

The display 1820 is electrically coupled to the computer 1810. The computer 1810 can cause the display 1820 to display graphics and/or text such as the input datasets, the combined datasets, and/or other graphics and/or text relating to the methods described herein. The computer 1810 can further cause the display 1820 to display a user interface, such as a graphical user interface, that allows a user to interact with the computer 1810 using one or more input device(s) 1830, which can include a mouse, a keyboard, a touchscreen, and/or other computer input devices.

The optional external memory 1840 can include a computer program product such as a non-transitory computer readable storage media. The external memory 1840 can store computer-readable instructions that cause the processors 900, 1400, and/or 1850 to perform the methods or one or more steps of the methods described herein (e.g., methods 10, 30, and/or 1000). Thus, the computer-readable instructions can be stored in computer memory 1860 and/or in external memory 1840.

The invention should not be considered limited to the particular embodiments described above. Various modifications, equivalent processes, as well as numerous structures to which the invention may be applicable, will be readily apparent to those skilled in the art to which the invention is directed upon review of this disclosure. The above-described embodiments may be implemented in numerous ways. One or more aspects and embodiments involving the performance of processes or methods may utilize program instructions executable by a device (e.g., a computer, a processor, or other device) to perform, or control performance of, the processes or methods.

In this respect, various inventive concepts may be embodied as a non-transitory computer readable storage medium (or multiple non-transitory computer readable storage media) (e.g., a computer memory of any suitable type including transitory or non-transitory digital storage units, circuit configurations in Field Programmable Gate Arrays or other semiconductor devices, or other tangible computer storage medium) encoded with one or more programs that, when executed on one or more computers or other processors, perform methods that implement one or more of the various embodiments described above. When implemented in software (e.g., as an app), the software code may be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer, as non-limiting examples. Additionally, a computer may be embedded in a device not generally regarded as a computer but with suitable processing capabilities, including a Personal Digital Assistant (PDA), a smartphone or any other suitable portable or fixed electronic device.

Also, a computer may have one or more communication devices, which may be used to interconnect the computer to one or more other devices and/or systems, such as, for example, one or more networks in any suitable form, including a local area network or a wide area network, such as an enterprise network, and intelligent network (IN) or the Internet. Such networks may be based on any suitable technology and may operate according to any suitable protocol and may include wireless networks or wired networks.

Also, a computer may have one or more input devices and/or one or more output devices. These devices can be used, among other things, to present a user interface. Examples of output devices that may be used to provide a user interface include printers or display screens for visual presentation of output and speakers or other sound generating devices for audible presentation of output. Examples of input devices that may be used for a user interface include keyboards, and pointing devices, such as mice, touch pads, and digitizing tablets. As another example, a computer may receive input information through speech recognition or in other audible formats.

The non-transitory computer readable medium or media may be transportable, such that the program or programs stored thereon may be loaded onto one or more different computers or other processors to implement various one or more of the aspects described above. In some embodiments, computer readable media may be non-transitory media.

The terms "program," "app," and "software" are used herein in a generic sense to refer to any type of computer code or set of computer-executable instructions that may be employed to program a computer or other processor to implement various aspects as described above. Additionally, it should be appreciated that, according to one aspect, one or more computer programs that when executed perform methods of this application need not reside on a single computer or processor but may be distributed in a modular fashion among a number of different computers or processors to implement various aspects of this application.

Computer-executable instructions may be in many forms, such as program modules, executed by one or more computers or other devices. Generally, program modules include routines, programs, objects, components, data structures, etc. that performs particular tasks or implement particular abstract data types. The functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Thus, the disclosure and claims include new and novel improvements to existing methods and technologies, which were not previously known nor implemented to achieve the useful results described above. Users of the method and system will reap tangible benefits from the functions now made possible on account of the specific modifications described herein causing the effects in the system and its outputs to its users. It is expected that significantly improved operations can be achieved upon implementation of the claimed invention, using the technical components recited herein.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

What is claimed is:

1. A computer-implemented method comprising:
receiving, with a computer, first and second datasets;
performing, with the computer, column discovery on the first and second datasets using a first trained machine-learning model that generates first vector embeddings to produce a column map that indexes one or more columns in the first dataset to one or more columns in the second dataset;
performing, with the computer, row discovery on the first and second datasets using a second trained machine-learning model that generates second vector embeddings, a trained approximate nearest neighbor (ANN) index, and the first vector embeddings to produce a row map that indexes one or more rows in the first dataset to one or more rows in the second dataset;
combining, with the computer, the first and second datasets using the column map and the row map to form a combined dataset; and
performing one or more actions with the combined dataset;
wherein the step of performing column discovery further includes training and fitting, with the computer, a first machine-learning model on a corpus of concatenated n-grams of dataset values taken along a respective column dimension of respective columns of the first and second datasets to form the first trained word vectorizer; and
wherein the word vectorizer further includes a dimensionality-reduction model.

2. The computer-implemented method of claim 1, wherein the first and second datasets comprise first and second tables, respectively.

3. The computer-implemented method of claim 1, wherein the first machine-learning model includes a word vectorizer.

4. The computer-implemented method of claim 1, wherein the step of performing column discovery further includes:
converting, with the computer, the dataset values in a subset of columns in the first and second datasets to respective text strings;
converting, with the computer, each text string to one or more n-grams, each n-gram having n characters from the respective text string, where n is an integer of at least 2; and
concatenating, with the computer, the n-gram(s) of each text string along the respective column dimension of the respective columns to form the corpus of concatenated n-grams.

5. The computer-implemented method of claim 1, wherein the step of performing column discovery further includes:
producing, with the first trained machine-learning model, a plurality of vectors that correspond to the respective columns;
combining, with the computer, the vectors that correspond to the respective columns of the first and second datasets into first and second matrices, respectively;
determining, with the computer, similarity metrics for the first and second matrices, wherein each similarity metric represents a quantitative similarity between the dataset values in a respective first-dataset column and the dataset values in a respective second-dataset column;
determining, with the computer, whether any of the similarity metrics is higher than a threshold similarity metric; and
adding, with the computer, for each similarity metric that is higher than the threshold similarity metric, a respective column index to the column map, the respective column index indicating an association between the respective first-dataset column and the respective second-dataset column.

6. The computer-implemented method of claim 5, wherein the step of performing column discovery further includes discarding, with the computer, each similarity metric that is lower than or equal to the threshold similarity metric to indicate that there is no association between the respective first-dataset column and the respective second-dataset column.

7. The computer-implemented method of claim 1, wherein the step of performing row discovery further includes training and fitting, with the computer, a second machine-learning model on a corpus of concatenated n-grams of dataset values taken along a respective row dimension of respective rows of the first and second datasets to form the second trained word vectorizer.

8. The computer-implemented method of claim 7, wherein the second machine-learning model includes a word vectorizer.

9. The computer-implemented method of claim 8, wherein the word vectorizer further includes a dimensionality-reduction model.

10. The computer-implemented method of claim 7, wherein the step of performing row discovery further includes:
producing, with the second trained machine-learning model, a plurality of vectors that correspond to the respective rows;
combining, with the computer, the vectors that correspond to the respective rows of the first and second datasets into first and second matrices, respectively;
training, with the computer, an ANN index with the second matrix to form the trained ANN index; and
querying, with the computer, the trained ANN index with the first matrix to produce the row map.

11. The computer-implemented method of claim 1, further comprising receiving a validation signal that approves the column discovery.

12. The computer-implemented method of claim 1, further comprising:
receiving a rejection signal that rejects the column discovery; and
receiving one or more column-edit input signals to modify the column discovery.

13. The computer-implemented method of claim 1, further comprising receiving a validation signal or a rejection signal that approves or rejects, respectively, the combined dataset.

14. A computer system comprising:
a display screen; and
a computer comprising:
one or more processors; and
non-volatile memory operatively coupled to the processor, the non-volatile memory storing computer-readable instructions that, when executed by the processor(s), cause the processor(s) to:
receive first and second datasets;
perform column discovery on the first and second datasets using a first trained machine-learning model to produce a column map that indexes one or more columns in the first dataset to one or more columns in the second dataset;
perform row discovery on the first and second datasets using a second trained machine-learning model, a trained approximate nearest neighbor (ANN) index, and the column map to produce a row map that indexes one or more rows in the first dataset to one or more rows in the second dataset;
combine the first and second datasets using the column map and the row map to form a combined dataset; and
display the combined dataset on the display screen, the display screen electrically coupled to the computer;
wherein the processor(s) include a column-discovery processor and first and second pre-processors, the discovery processor having an input that is electrically coupled to a respective output of the first and second pre-processors;
wherein the computer-readable instructions cause the column-discovery processor to train and fit a first machine-learning model on a corpus of concatenated n-grams of dataset values taken along a respective column dimension of respective columns of the first and second datasets to form the first trained machine-learning model; and
wherein:
the computer-readable instructions cause the first and second pre-processors to:
convert the dataset values in a subset of columns in the first and second datasets to respective text strings; and
convert each text string to one or more n-grams, each n-gram having n characters from the respective text string, where n is an integer of at least 2; and
the computer-readable instructions further cause the column-discovery processor to:
concatenate the n-gram(s) of each text string along the respective column dimension of the respective columns to form the corpus of concatenated n-grams;
produce, using the first machine-learning model, a plurality of vectors that correspond to the respective columns;
combine the vectors that correspond to the respective columns of the first and second datasets into first and second matrices, respectively;
determine similarity metrics for the first and second matrices, wherein each similarity metric represents a quantitative similarity between the dataset values in a respective first-dataset column and the dataset values in a respective second-dataset column;
determine whether any of the similarity metrics is higher than a threshold similarity metric; and
add, for each similarity metric that is higher than the threshold similarity metric, a respective column index to the column map, the respective column index indicating an association between the respective first-dataset column and the respective second-dataset column.

15. The computer system of claim 14, wherein the computer-readable instructions further cause the processor(s) to
receive a rejection signal that rejects the column discovery;
receive one or more column-edit input signals to modify the column discovery; and
modify the column discovery based on the column-edit input signal(s).

16. A computer system comprising:
a display screen; and
a computer comprising:
one or more processors; and
non-volatile memory operatively coupled to the processor, the non-volatile memory storing computer-readable instructions that, when executed by the processor(s), cause the processor(s) to:
receive first and second datasets;
perform column discovery on the first and second datasets using a first trained machine-learning model to produce a column map that indexes one or more columns in the first dataset to one or more columns in the second dataset;
perform row discovery on the first and second datasets using a second trained machine-learning model, a trained approximate nearest neighbor (ANN) index, and the column map to produce a row map that indexes one or more rows in the first dataset to one or more rows in the second dataset;

combine the first and second datasets using the column map and the row map to form a combined dataset; and display the combined dataset on the display screen, the display screen electrically coupled to the computer; wherein:

the processor(s) include first and second pre-processors, a row-embedding processor, an index-creation processor, and a query-index processor, the computer-readable instructions cause the first and second pre-processors to:

convert the dataset values in a subset of columns in the first and second datasets to respective text strings;

convert each text string to one or more n-grams, each n-gram having n characters from the respective text string, where n is an integer of at least 2;

the computer-readable instructions cause the row-embedding processor to:

concatenate the n-gram(s) of each text string along a respective row dimension of respective rows of the first and second datasets to form a corpus of concatenated n-grams;

train and fit a second machine-learning model on the corpus of concatenated n-grams of dataset values to form the second trained word vectorizer;

produce, with the second trained word vectorizer, a plurality of vectors that correspond to the respective rows;

combine the vectors that correspond to the respective rows of the first and second datasets into first and second matrices, respectively;

the computer-readable instructions cause the index-creation processor to:

train and fit an ANN index with the second matrix to form the trained ANN index; and the computer-readable instructions cause the query-index processor to:

query the trained ANN index with the first matrix to produce the row map.

17. A computer-implemented method comprising:

receiving, with a computer, first and second datasets;

performing, with the computer, column discovery on the first and second datasets using a first trained machine-learning model that generates first vector embeddings to produce a column map that indexes one or more columns in the first dataset to one or more columns in the second dataset;

performing, with the computer, row discovery on the first and second datasets using a second trained machine-learning model that generates second vector embeddings, a trained approximate nearest neighbor (ANN) index, and the first vector embeddings to produce a row map that indexes one or more rows in the first dataset;

displaying, on a display screen electrically coupled to the computer, a first output table that represents matched rows in the first and second datasets;

receiving one or more input signals that identify incorrect row matches and correct row matches in the first output table;

training a third machine-learning model with a training dataset that includes the incorrect row matches, the correct row matches, and the column map to form a trained third machine-learning model;

performing, with the computer, row discovery on the first and second datasets using the trained third machine-learning model;

displaying, on the display screen, a second output table that represents matched rows in the first and second datasets based on the trained third machine-learning model; and storing a combined dataset in computer memory, the combined dataset formed using the trained third machine-learning model.

18. The method of claim 17, further comprising:

receiving one or more input signals that identify incorrect row matches and correct row matches in the second output table;

updating a training of the trained third machine-learning model with an updated training dataset that includes the incorrect row matches and the correct row matches from the second output table to form an updated trained third machine-learning model;

performing, with the computer, row discovery on the first and second datasets using the updated trained third machine-learning model; and displaying, on the display screen, a third output table that represents matched rows in the first and second datasets based on the updated trained third machine-learning model, wherein the combined dataset is formed using the updated trained third machine-learning model.

19. The method of claim 17, further comprising:

receiving, with a computer, third and fourth datasets that have the same columns as the first and second datasets, respectively;

performing, with the computer, row discovery on the third and fourth datasets using the updated trained third machine-learning model;

displaying, on the display screen, a fourth output table that represents matched rows in the third and fourth datasets based on the updated trained third machine-learning model; and storing a second combined dataset in computer memory, the second combined dataset including the matched rows in the third and fourth datasets.

20. A computer-implemented method comprising:

receiving, with a computer, first and second datasets;

performing, with the computer, column discovery on the first and second datasets using a first trained machine-learning model that generates first vector embeddings to produce a column map that indexes one or more columns in the first dataset to one or more columns in the second dataset;

performing, with the computer, row discovery on the first and second datasets using a second trained machine-learning model that generates second vector embeddings, a trained approximate nearest neighbor (ANN) index, and the first vector embeddings to produce a row map that indexes one or more rows in the first dataset to one or more rows in the second dataset;

combining, with the computer, the first and second datasets using the column map and the row map to form a combined dataset; and performing one or more actions with the combined dataset;

wherein the step of performing column discovery further includes training and fitting, with the computer, a first machine-learning model on a corpus of concatenated n-grams of dataset values taken along a respective column dimension of respective columns of the first and second datasets to form the first trained word vectorizer; and wherein the step of performing column discovery further includes:
converting, with the computer, the dataset values in a subset of columns in the first and second datasets to respective text strings;
converting, with the computer, each text string to one or more n-grams, each n-gram having n characters from the respective text string, where n is an integer of at least 2; and
concatenating, with the computer, the n-gram(s) of each text string along the respective column dimension of the respective columns to form the corpus of concatenated n-grams.

21. A computer-implemented method comprising:
receiving, with a computer, first and second datasets;
performing, with the computer, column discovery on the first and second datasets using a first trained machine-learning model that generates first vector embeddings to produce a column map that indexes one or more columns in the first dataset to one or more columns in the second dataset;
performing, with the computer, row discovery on the first and second datasets using a second trained machine-learning model that generates second vector embeddings, a trained approximate nearest neighbor (ANN) index, and the first vector embeddings to produce a row map that indexes one or more rows in the first dataset to one or more rows in the second dataset;
combining, with the computer, the first and second datasets using the column map and the row map to form a combined dataset; and
performing one or more actions with the combined dataset;
wherein the step of performing column discovery further includes training and fitting, with the computer, a first machine-learning model on a corpus of concatenated n-grams of dataset values taken along a respective column dimension of respective columns of the first and second datasets to form the first trained word vectorizer; and
wherein the step of performing column discovery further includes:
producing, with the first trained machine-learning model, a plurality of vectors that correspond to the respective columns;
combining, with the computer, the vectors that correspond to the respective columns of the first and second datasets into first and second matrices, respectively;
determining, with the computer, similarity metrics for the first and second matrices, wherein each similarity metric represents a quantitative similarity between the dataset values in a respective first-dataset column and the dataset values in a respective second-dataset column;
determining, with the computer, whether any of the similarity metrics is higher than a threshold similarity metric; and
adding, with the computer, for each similarity metric that is higher than the threshold similarity metric, a respective column index to the column map, the respective column index indicating an association between the respective first-dataset column and the respective second-dataset column.

22. The computer-implemented method of claim 21, wherein the step of performing column discovery further includes discarding, with the computer, each similarity metric that is lower than or equal to the threshold similarity metric to indicate that there is no association between the respective first-dataset column and the respective second-dataset column.

23. A computer-implemented method comprising:
receiving, with a computer, first and second datasets;
performing, with the computer, column discovery on the first and second datasets using a first trained machine-learning model that generates first vector embeddings to produce a column map that indexes one or more columns in the first dataset to one or more columns in the second dataset;
performing, with the computer, row discovery on the first and second datasets using a second trained machine-learning model that generates second vector embeddings, a trained approximate nearest neighbor (ANN) index, and the first vector embeddings to produce a row map that indexes one or more rows in the first dataset to one or more rows in the second dataset;
combining, with the computer, the first and second datasets using the column map and the row map to form a combined dataset; and
performing one or more actions with the combined dataset;
wherein the step of performing row discovery further includes training and fitting, with the computer, a second machine-learning model on a corpus of concatenated n-grams of dataset values taken along a respective row dimension of respective rows of the first and second datasets to form the second trained word vectorizer.

24. The computer-implemented method of claim 23, wherein the second machine-learning model includes a word vectorizer.

25. The computer-implemented method of claim 24, wherein the word vectorizer further includes a dimensionality-reduction model.

26. The computer-implemented method of claim 23, wherein the step of performing row discovery further includes:
producing, with the second trained machine-learning model, a plurality of vectors that correspond to the respective rows;
combining, with the computer, the vectors that correspond to the respective rows of the first and second datasets into first and second matrices, respectively;
training, with the computer, an ANN index with the second matrix to form the trained ANN index; and
querying, with the computer, the trained ANN index with the first matrix to produce the row map.

* * * * *